(12) United States Patent
Jain et al.

(10) Patent No.: US 6,263,091 B1
(45) Date of Patent: *Jul. 17, 2001

(54) SYSTEM AND METHOD FOR IDENTIFYING FOREGROUND AND BACKGROUND PORTIONS OF DIGITIZED IMAGES

(75) Inventors: Anil K. Jain, Okemos; Lin Hong, Lansing, both of MI (US); Rudolf Maarten Bolle, Bedford Hills; Sharathchandra Umapathirao Pankanti, Mt. Kisco, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,344

(22) Filed: Feb. 25, 1998

Related U.S. Application Data

(60) Provisional application No. 60/056,677, filed on Aug. 22, 1997.

(51) Int. Cl.⁷ ........................................................ G06K 9/00
(52) U.S. Cl. ........................ 382/125; 382/124; 382/173; 382/190; 382/197
(58) Field of Search ...................................... 382/124, 125, 382/190, 192, 195, 197, 224, 204, 205, 209, 173

(56) References Cited

U.S. PATENT DOCUMENTS

| | | | |
|---|---|---|---|
| 4,151,512 | 4/1979 | Riganati et al. | 382/125 |
| 4,310,827 | 1/1982 | Asai | 382/192 |
| 4,635,048 * | 1/1987 | Nishi et al. | 340/701 |
| 4,817,183 | 3/1989 | Sparrow | 382/204 |
| 5,105,467 * | 4/1992 | Kim et al. | 382/4 |
| 5,140,642 | 8/1992 | Hsu et al. | 382/205 |

(List continued on next page.)

OTHER PUBLICATIONS

N. K. Ratha, S. C. Chen and A. K. Jain, "Adaptive Flow Orientation Based Feature Extraction in Fingerprint Images", Journal of Pattern Recognition, vol. 28, No. 11, pp. 1657–1672, Nov. 1995.

D. H. Ballard et al., "Computer Vision," Prentice Hall, Inc. Englewood Cliffs, NJ 07632, 1982, Chapter 4, Boundary Detection, pp. 149–150.

R. M. Haralick et al. Computer and Robot Vision, Conditioning and Labeling, Chapter 7, Section 7.4.1, pp. 338–339.

M. Kawagoe et al., "Fingerprint Pattern Classifications," Pattern Recognition, vol. 17, No. 3, pp. 295–303, Pergamon Press Ltd., 1984.

(List continued on next page.)

*Primary Examiner*—Matthew C. Bella
*Assistant Examiner*—Sheela Chawan
(74) *Attorney, Agent, or Firm*—Louis J. Percello; Perman & Green, LLP

(57) ABSTRACT

Disclosed in a system and method for segmenting foreground pixel from background pixels in a digital image, specifically a fingerprint image. First the image is divided into blocks of optimal size. Then, for a given block, an overall gradient magnitude and a projected gradient magnitude is determined. The overall gradient magnitude is a measure of the amount of intensity variation in the current block. If a large number (or all) of the pixels have a direction that is the same as the overall gradient direction, the projected gradient magnitude will be nearly equal (will be equal) to the overall gradient magnitude. This indicates that the current block is a block in the foreground of the image. A relationship, e.g., a ratio, of the over gradient magnitude to the overall projected gradient magnitude is taken certainty level that the current block is in the foreground or background of the image. Connected blocks making up the largest region of foreground blocks are considered the foreground region, the rest of the blocks/regions are discarded (considered as background).

4 Claims, 16 Drawing Sheets

U.S. PATENT DOCUMENTS

| | | | |
|---|---|---|---|
| 5,608,811 | * 3/1997 | Kamei | 382/124 |
| 5,668,897 | * 9/1997 | Stolfo | 382/135 |
| 5,717,786 | * 2/1998 | Kamei | 382/125 |
| 5,724,456 | * 3/1998 | Boyack et al. | 382/173 |
| 5,883,971 | * 3/1999 | Bolle et al. | 382/124 |
| 6,005,963 | * 12/1999 | Bolle et al. | 382/125 |

OTHER PUBLICATIONS

B.M. Mehtre et al., "Segmentation of Fingerprint Images Using the Directional Image," Pattern Recognition, vol. 20, No. 4, pp. 429–435, Pergamon Journal Ltd, 1987.

A. Ravishankar Rao, Computerized Flow Field Analysis: Oriented Texture Fields, IEEE, 1992, pp. 693–709.

M. Kass et al, "Analyzing Oriented Patterns," Computer Vision, Graphics, and Image Processing, 37, 362–385, 1987.

N. J. Naccache et al, "An Investigation into the Skeletonization Approach of Hilditch," Pattern Recognition, vol. 17, No. 3, pp. 279–284, 1984.

* cited by examiner

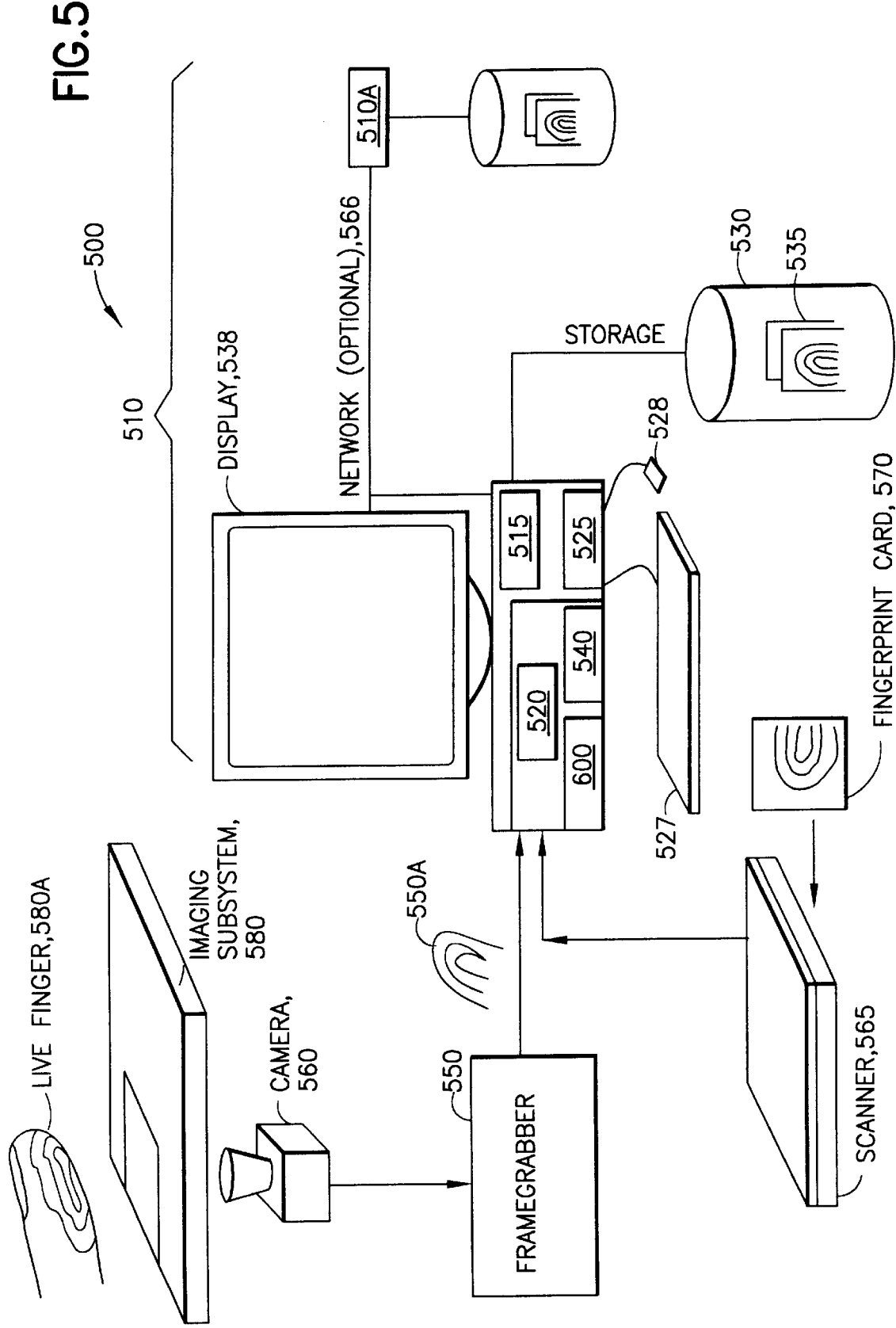

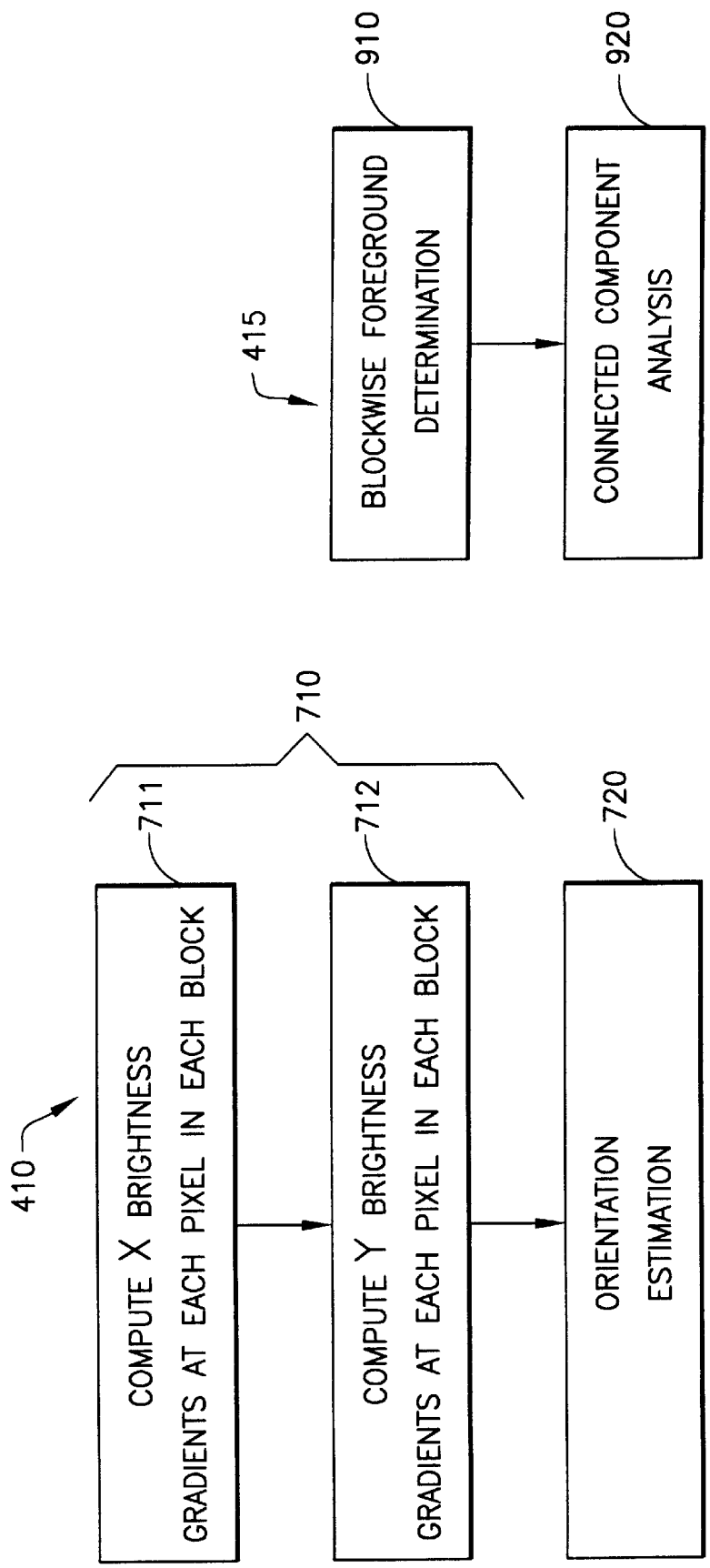

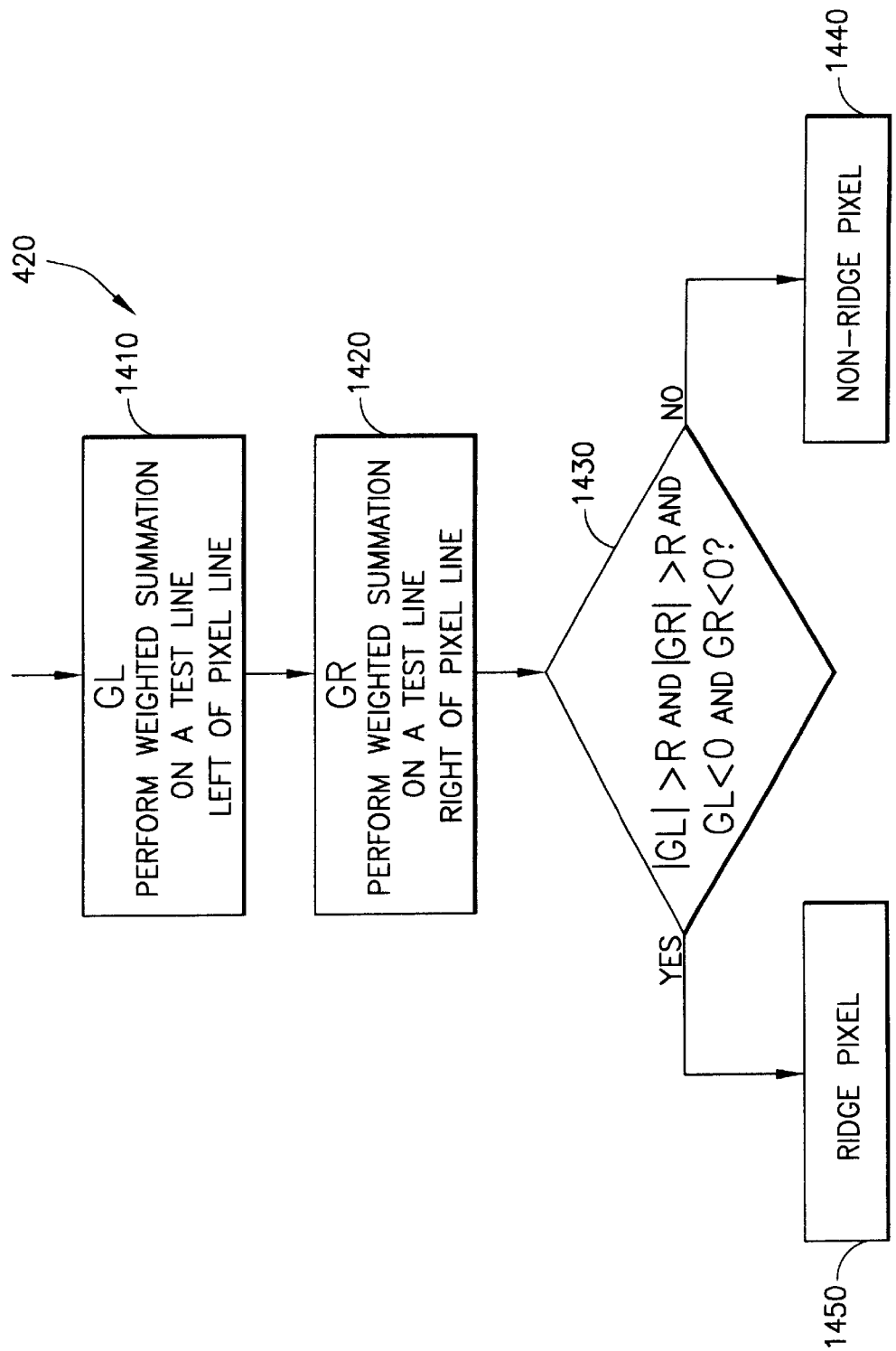

SYSTEM AND METHOD FOR IDENTIFYING FOREGROUND AND BACKGROUND PORTIONS OF DIGITIZED IMAGES

This patent claims priority to provisionally filed patent application Ser. No. 60/056,677 filed on Aug. 22, 1997.

RELATED PATENT APPLICATIONS

U.S. patent applications Ser. No. 722,714 entitled SYSTEM AND METHOD FOR DETERMINING THE QUALITY OF FINGERPRINT IMAGES to Bolle et al., Ser. No. 735,718 entitled SYSTEM AND METHOD FOR DETERMINING IF A FINGERPRINT IMAGE CONTAINS A SMUDGED IMPRESSION to Bolle et al., Ser. No. 735,721 entitled SYSTEM AND METHOD FOR DETERMINING IF A FINGERPRINT IMAGE CONTAINS A DRY IMPRESSION to Bolle et al., Ser. No. 735,541 entitled SYSTEM AND METHOD FOR DETERMINING IF A FINGERPRINT IMAGE CONTAINS A PARTIAL PRINT to Bolle et al., Ser. No. 06/034,268 entitled SYSTEM AND METHOD USING MINUTIAE PRUNING FOR FINGERPRINT IMAGE PROCESSING to Bolle et al., Ser. No. 06/032,713 entitled SYSTEM AND METHOD FOR DETERMINING RIDGE COUNTS IN FINGERPRINT IMAGE PROCESSING to Bolle et al., Ser. No. 08/837,069 entitled SYSTEM AND METHOD FOR DISTORTION CONTROL IN LIVE-SCAN INKLESS FINGERPRINT IMAGES to Bolle et al., are herein incorporated by reference in their entirety.

FIELD OF THE INVENTION

This invention relates to the field of image processing. More specifically, the invention relates to identifying foreground and background portions of digitized images, particularly fingerprint images.

BACKGROUND OF THE INVENTION

There exist systems for accomplishing automatic authentication or identification of a person using his/her fingerprint. A fingerprint of a person comprises a distinctive and unique ridge pattern structure. For authentication or identification purposes, this ridge pattern structure can be characterized by endings and bifurcations of the individual ridges. These features are popularly known as minutiae.

An example of portion of a fingerprint is shown in FIG. 1A. The minutiae for the portion of the fingerprint shown in FIG. 1A are shown in FIG. 1B as being enclosed by "boxes." For example, box 101B shows a bifurcation minutiae of a bifurcated ridge 10A and box 103B shows a ridge ending minutiae of ridge 103A. Note that minutiae on the ridges in fingerprints have directions (also called orientations) 105 associated with them. The direction 113B of a minutiae at a ridge end 103B is the direction in which the end of the ridge points. The direction 111B of a bifurcation minutiae 101B is the direction in which the bifurcated ridge points. Minutiae also have locations which are the positions, with respect to some coordinate system, of the minutiae on the fingerprint.

FIG. 2 is a flow chart showing the steps generally performed by a typical prior art system 200.

In step 210, the image is acquired. This acquisition of the image could either be through a CCD camera and framegrabber interface or through a document scanner communicating with the primary computing equipment.

Once the image is acquired into the computer memory or onto disk, relevant minutia features are extracted (220). Not all of the features thus extracted are reliable; some of the unreliable features are optionally edited or pruned (step 230), e.g. manually. The resultant reliable features are used for matching the fingers (step 240).

The fingerprint feature extraction 220, pruning 230, and matching system 240 constitute the primary backbone 250 of a typical minutiae-based automatic fingerprint identification systems (AFIS). The matching results are could be verified by a human expert or by an automatic process (step 260). The verification may also be performed automatically. The following reference describes examples of the state of the prior art for feature extraction:

Nalini K. Ratha and Shaoyun Chen and Anil K. Jain,
Adaptive flow orientation based feature extraction in fingerprint
images, Journal of Pattern Recognition,
vol. 28, no. 11, pp. 1657–1672, November, 1995.

This reference is herein incorporated by reference in its entirety.

FIG. 3A is a flow chart showing the prior art steps performed by a feature extraction process 220 that are similar to some of the feature extraction methods proposed by Ratha, Jain, and Chen in the article referenced above.

It is often not desirable to directly use the input fingerprint image for feature extraction. The fingerprint image might need an enhancement or preprocessing before one could further extract minutiae. Typically, a smoothing process is employed to reduce the pixel-wise noise (step 305).

After the preprocessing stages, prior art systems find the directions of the ridge flow (step 310). The next important step in the processing is finding the exact location of the finger in the image. To accomplish this a process referred to as the foreground/background segmentation (step 315) separates the finger part of the image from the background part of the image. Once the finger part is localized, i.e., segmented to define its location, the next step is to extract the ridges from the finger image (step 320). The ridges thus extracted are thick and might contain some noisy artifacts which do not correspond to any meaningful structures on the finger. These small structures, i.e., the noisy artifacts, can be safely removed and the longer structures are smoothed (step 325). The longer structures are thinned to one-pixel width and then processed to remove any other artifacts using morphological operators (step 330). The locations and orientations of ridge endings and bifurcations are then extracted from the thinned structures (step 335) to obtain the minutiae. In some systems, a "cleanup" or post processing 340 is performed. Here undesirable minutiae are removed based on some criteria.

One of the prevalent methods of fingerprint authentication and identification methods is based on minutiae features. These systems need to process the fingerprint images to obtain accurate and reliable minutiae features to effectively determine the identity of a person.

The following reference describes examples of the state of the prior art fingerprint matcher:

N. Ratha, K. Karu, S. Chen and A. K. Jain, A Real-time Matching System for Large Fingerprint Database, IEEE Transactions on Pattern Analysis and Machine Intelligence, Volume 18, Number 8, pages 799–813, 1996.

This reference is herein incorporated by reference in its entirety.

Given two (input and template) sets of features originating from two fingerprints, the objective of the feature matching system is to determine whether or not the prints represent the same finger. FIG. 3B is a flow chart showing the prior art steps performed by a feature matching system 240 that is similar to the feature matching system proposed by Ratha, Karu, Chen, and Jain in the article incorporated above.

A minutia in the input fingerprint and a minutiae in the template fingerprint are said to be corresponding if they represent the identical minutiae scanned from the same finger. An alignment estimation method based on Generalized Hough Transform estimates the parameters of the overall rotation, scaling and translation between the features of the input and template fingerprint (350). In step 360 the input fingerprint features are aligned with the template fingerprint using the rotation, translation, and scaling parameters estimated in step 350. In step 370, the aligned features of the input fingerprint features are matched with the features of the template fingerprint features. The matching consists of counting the number of features in the aligned input fingerprint representation for which there exists a corresponding consistent feature in the template fingerprint representation. The verification of a corresponding feature is performed as follows: for each feature in the aligned input fingerprint feature, the matcher determines whether there is a consistent template fingerprint feature in its rectangular neighborhood whose size is predetermined. Normalizer 380 takes the raw score generated by the matcher and computes a normalized score. The higher the normalized score, the higher the likelihood that the test and template fingerprints are the scans of the same finger.

A number of terms will be defined at the outset.

Pixels in an image could be organized in rows and columns. A pixel location in image is determined by the row and column number of that pixel in the image.

Orientation/direction attribute of a pixel in an image could refer to the direction of any number of physical events associated with that pixel. In some circumstances, it could mean the direction of image brightness gradient. In a sequence of images in a video, it could refer to the direction of movement of a pixel from one image frame to the next. In this disclosure, we are interested in the direction of image brightness gradient in general. In this description, a preferred image is a fingerprint image and these images will be described as an example embodiment of the invention without loss of generality. As describe below, other implementations of the invention are envisioned. One orientation at a pixel is referred to in this document, is the direction of the fingerprint ridge flow at the pixel in a fingerprint image.

A pixel neighborhood function of a given pixel identifies which pixels spatially adjacent to that pixel could be considered as its neighbors.

A block is contiguous connected region, typically bounded by a polygon, in an image. Block size of a block is determined by the area of the block and typically defined in terms of number of pixels.

A block neighborhood function of a given block identifies which blocks spatially adjacent to that block could be considered as its neighbors.

A block direction refers to the direction which can represent the directions of all/most of the pixels in the given block.

The orientation field of a fingerprint image represents the intrinsic nature of the fingerprint image. It plays a very important role in fingerprint image analysis. A number of methods have been proposed to estimate the orientation field of fingerprint images as disclosed in the references cited below which are herein incorporated by reference in their entirety:

Kawagoe and A. Tojo, Fingerprint Pattern Classification, Pattern Recognition, Vol. 17, No. 3, pp. 295–303, 1984.

A. R. Rao and R. C. Jain, Computerized Flow Field Analysis: Oriented Texture Fields, Transactions of Pattern Analysis and Machine Intelligence, July, 1992, Vol. 14, No. 7, pages 693–709.

B. M. Mehtre, N. N. Murthy, S. Kapoor, and B. Chatterjee, Segmentation of Fingerprint Images Using the Directional Image, Pattern Recognition, Vol. 20, No. 4, pp. 429–435, 1987.

M. Kass and A. Witkin, Analyzing Oriented Patterns, Computer Vision, Graphics and Image Processing, Vol. 37, No. 4, pp. 362–385, 1987.

STATEMENT OF PROBLEMS WITH THE PRIOR ART

The problem with the prior art is that their estimation of the orientation field is not smooth and accurate. The imaging system presents a number of peculiar and challenging situations some of which are unique to the fingerprint image capture scenario:

(i) Inconsistent contact: The act of sensing distorts the finger. Determined by the pressure and contact of the finger on the glass platen, the three-dimensional surface of the finger gets mapped onto the two-dimensional surface of the glass platen. Typically, this mapping function is uncontrolled and results in different inconsistently mapped fingerprint images across the impressions.

(ii) Non-uniform contact: The ridge structure of a finger would be completely captured if ridges of the part of the finger being imaged are in complete optical contact with the glass platen. However, the dryness of the skin, skin disease, sweat, dirt, humidity in the air all confound the situation resulting in a non-ideal contact situation: some parts of the ridges may not come in complete contact with the platen and regions representing some valleys may come in contact with the glass platen. This results in "noisy" low contrast images, leading to either spurious minutiae or missing minutiae.

(iii) Irreproducible contact: Manual work, accidents etc. inflict injuries to the finger, thereby, changing the ridge structure of the finger either permanently or semi-permanently. This may introduce additional spurious minutiae.

(iv) Feature extraction artifacts: The feature extraction algorithm is imperfect and introduces measurement errors. Various image processing operations might introduce inconsistent biases to perturb the location and orientation estimates of the reported minutiae from their gray scale counterparts.

(vi) The act of sensing itself adds noise to the image. For example, residues are leftover from the previous fingerprint capture. A typical imaging system distorts the image of the object being sensed due to imperfect imaging conditions. In the frustrated total internal reflection (FTIR) sensing scheme, for example, there is a geometric distortion because the image plane is not parallel to the glass platen.

In light of the operational environments mentioned above, the design of prior art, feature extraction algorithms 220 can not reliably estimate the directions of the ridge orientations (estimated in 310), identify region depicting the fingerprint (foreground region region estimated in 315), or extract ridges (step 320) in poor quality images. The present invention has an improved method of extracting orientation of ridges and extracting ridges.

OBJECTS OF THE INVENTION

An object of this invention is an improved image processing system.

An object of the invention is the foreground/background segmentation of a digital image.

An objective of the invention is the foreground/background segmentation of a fingerprint image.

SUMMARY OF THE INVENTION

Disclosed is a system and method for segmenting foreground pixel from background pixels in a digital image, specifically a fingerprint image. First the image is divided into blocks of optimal size. Then, for a given block, an overall gradient magnitude and a projected gradient magnitude is determined. The overall gradient magnitude is a measure of the amount of intensity variation in a current block under consideration. An overall gradient direction is a measure of direction in the current block for which the maximum intensity variation in the current block is greatest (or alternatively least). An overall projected gradient magnitude is a measure of the vector component contribution of the overall gradient magnitude in the overall gradient direction. If a large number (or all) of the pixels have a direction that is the same as the overall gradient direction, the projected gradient magnitude will be nearly equal (will be equal) to the overall gradient magnitude. This indicates that the current block is a block in the foreground of the image, e.g., part of a fingerprint in the image.

For example, if the current block has a block size, as determined above, that includes one or more fingerprint ridges in a given direction, then the projected gradient magnitude will be nearly equal to the overall gradient magnitude. However, if the pixels in the current block have little variation in their intensity and have random directions, the projected gradient magnitude will be small compared to the overall gradient magnitude indicating that the current block does not include any foreground in the image, i.e., the current block is in the background.

In a preferred embodiment, a ratio of the overall gradient magnitude to the overall projected gradient magnitude is taken as a metric, i.e., certainty level, that the current block is in the foreground or background of the image.

Once the set of all foreground blocks is identified, the connectivities of all the blocks (e.g., a set of foreground blocks belong to single connected region comprising of foreground blocks) is determined. The connected blocks making up the largest region of foreground blocks is considered the foreground region, the rest of the blocks/regions are discarded (considered as background).

BRIEF DESCRIPTION OF THE DRAWINGS

The foregoing and other objects, aspects and advantages will be better understood from the following detailed description of preferred embodiments of the invention with template to the drawings that include the following:

FIG. 5 is a block diagram of one preferred embodiment of the present fingerprint matching system.

FIG. 7 is a flowchart showing the steps performed in compute block direction (step 410) in FIG. 4.

FIG. 9 is shows as steps performed in the foreground/background segmentation process (step 415) shown in FIG. 4.

FIG. 14 is a flowchart showing the steps performed in ridge extraction (step 420) in FIG. 4.

DETAILED DESCRIPTION OF THE INVENTION

Figure 1A:
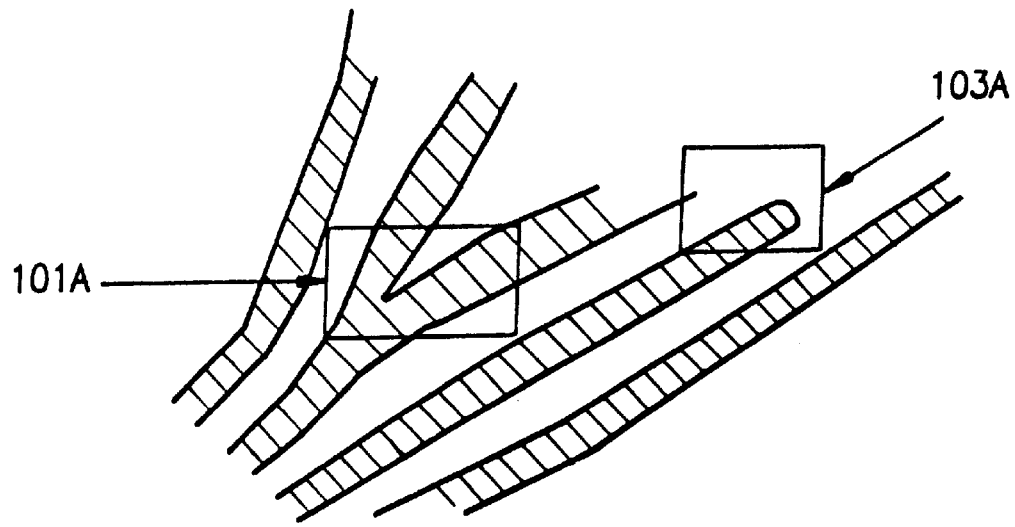
FIG. 1A is a prior art drawing of a portion of a typical fingerprint.
Figure 1B:
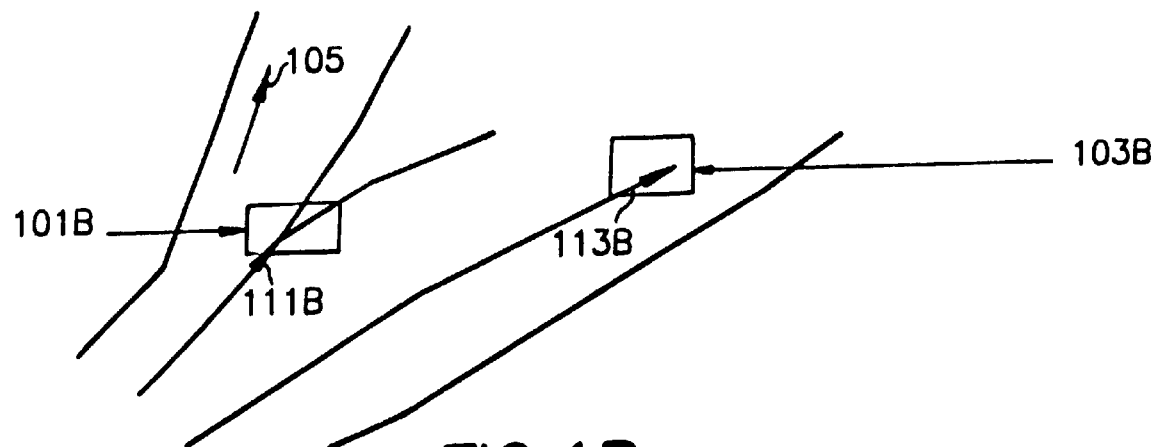
FIG. 1B is a prior art drawing showing minutiae of the portion of the finger print in FIG. 1A.
Figure 2:
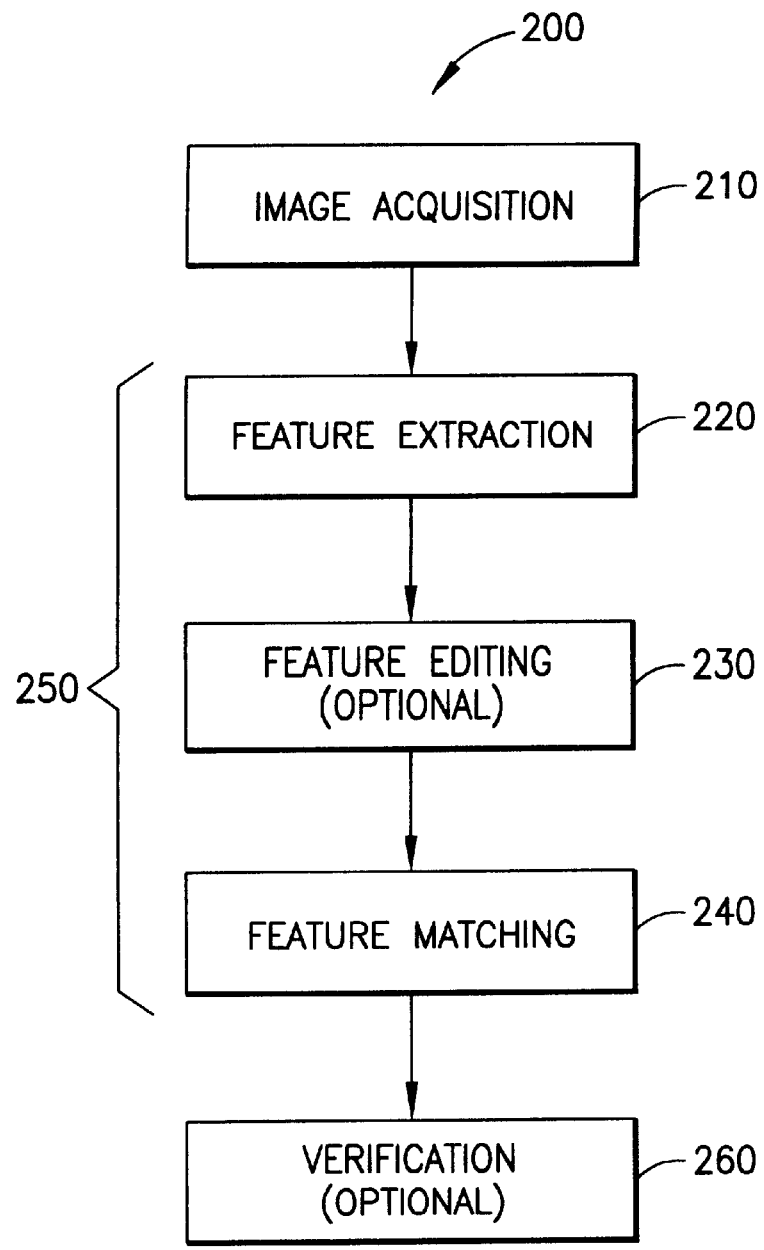
FIG. 2 is a block diagram of a typical prior art system.

As a prerequisite for the present invention, it is necessary to robustly estimate the orientation of a given pixel (or a set of pixels representing a region) in the image. A preferred embodiment of this estimation is given below and is further described and claims in U.S. Patent Application entitled SYSTEM AND METHOD FOR DETERMINING BLOCK DIRECTION IN (FINGERPRINT) IMAGES to the same inventors as this disclosure, filed on the same day as this disclosure and herein incorporated by reference in its entirety.

The orientation for a plurality of pixel, preferably all pixels in the image, is determine. This results in a matrix of orientations called a direction/orientation field. In order to determine this field reliably, the invention determines an optimal block size for a group of one or more pixels in the image. A block direction for the chosen block is determined which is assigned to the pixels within the block.

We will start with definitions and a description of the notation used in this disclosure.

The distance between two point coordinates referred to in this document is the geometric or Euclidean distance and computation of geometric distance and the corresponding concept of length is apparent to those skilled in the art.

A geometric line segment is an abstract conceptual entity comprising an infinite set of geometric points, each occupying zero area; the geometric line segment could be typically defined by slope, geometric length, a prespecified Cartesian coordinate of a point belonging to the line segment with respect to its end points. The digital line segment corresponding to a geometric line segment is described by set of pixels as determined by the discrete quantization scheme. Similarly, given a geometric point coordinate, the corresponding digital pixel is also determined by the discrete quantization scheme. These concepts of digital and geometric conversions are apparent to those skilled in the art.

Assume that image is square and of size M×M; M pixels wide and M pixels high. In the preferred embodiment of the system, M=512 pixels; the image consisted of 512×512 pixels. Each pixel could be referred using the row and column of the pixels to which it belongs. For example, the pixel in the first column and first row is referred to as (1,1) pixel and the pixel in the second row and third column of pixels will be addressed as the (3,2) pixel. There will be M rows and M columns, in all M×M pixels. Brightness (or gray value) at a pixel at (i,j) will be denoted by g(i,j). The X axis is assumed to be aligned with the column direction and Y axis is assumed to be aligned with the row direction.

The image is divided into many smaller subimages. Each such subimage is called a block. The shape and size of each block could vary; the sizes of the individual blocks may not be identical.

In one preferred embodiment of the system, the blocks are square and identical in sizes. Each block consisted of a square subimage of size W×W pixels; preferably M is divisible by W. In a more preferred embodiment W was between 10 to 20 pixels and more preferably W is set to 16 pixels.

Figure 6A:
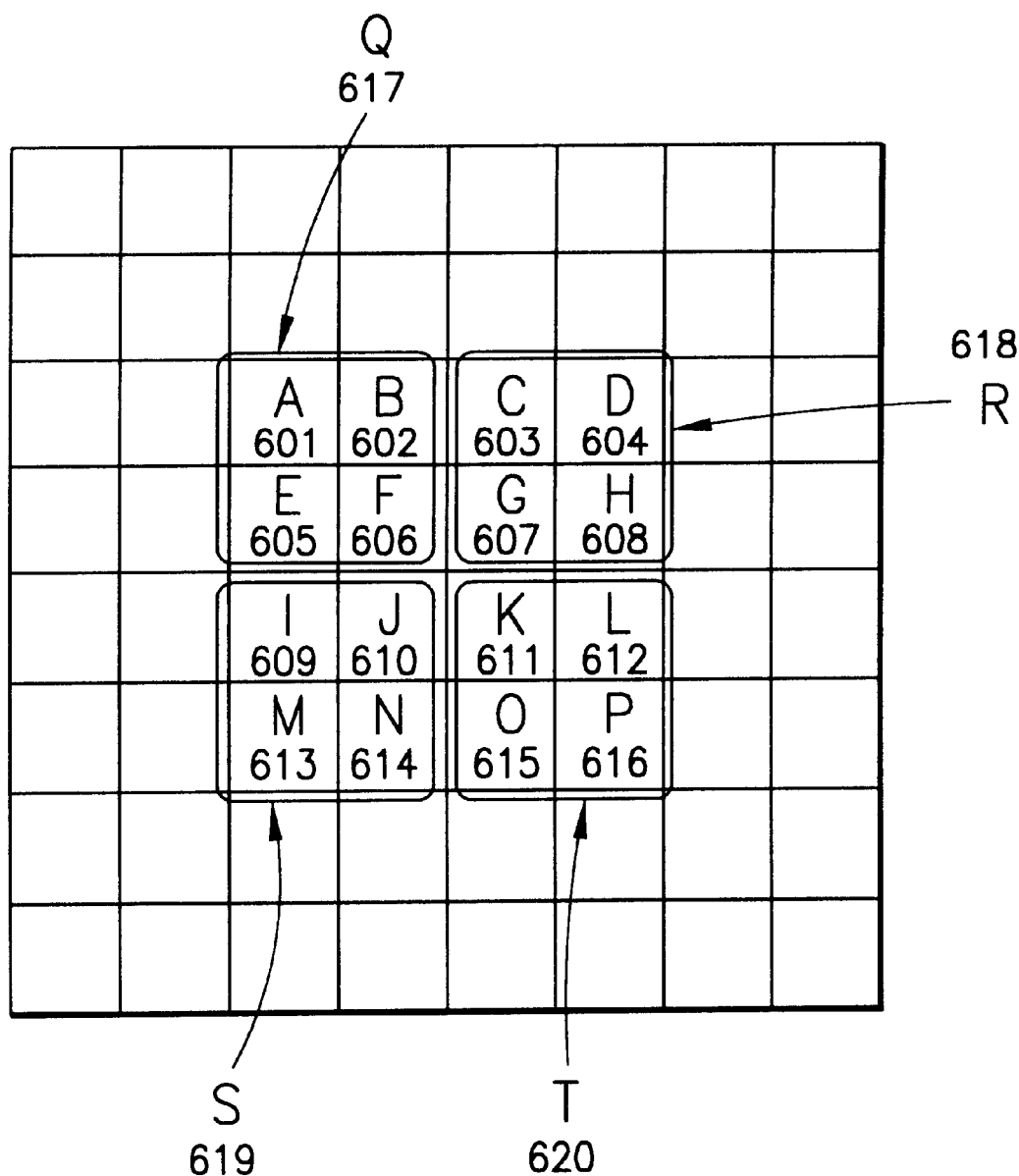
FIG. 6 comprising of 6A, 6B, 6C, 6D shows different methods of blocking and neighborhood functions.
Figure 6B:
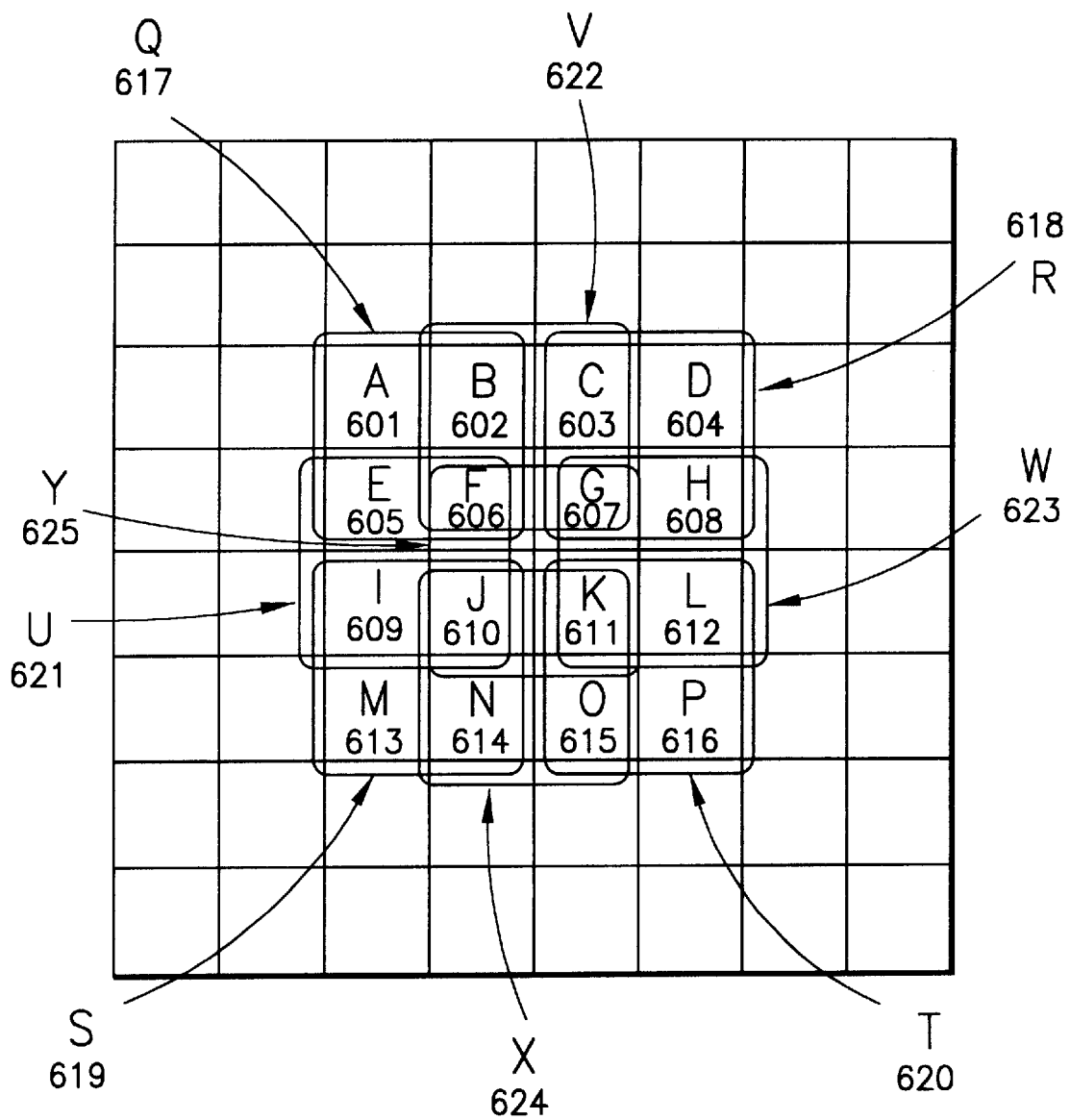

As shown in FIGS. 6A and 6B, the blocks may have been defined in a non-overlapped manner (6A) or partially-overlapped manner (6B). In a preferred embodiment of the system identical square sized blocks (of size W×W pixels) were defined in a non-overlapped manner described in FIG. 6A. Each pixel in the image is included in only one block; the pixels comprising a block are said to belong to that block. In the preferred embodiment, blocks are non-overlapping rectangular as shown in FIG. 6A, e.g, adjacent pixels A 601, B 602, C 603, D 604, E 605, F 606, G 607, H 608, I 609, J 610, K 611, L 612, M 613, N 614, O 615, and P 616 are grouped into non-overlapping rectangular blocks Q 617 (comprising of A 601, B 602, E 605, and F 606), R 618 (comprising of C 603, D 604, G 607 and H 608), S 618 (comprising of I 609, J 610, M 613, and N 614), and T 620 (comprising of K 611, L 612, O 615, and P 616).

When image I is subdivided into blocks, each block could be referred to by the row and column of the blocks to which it belongs. (Note that these rows and columns are "block" rows and columns and not the rows and columns used to identify pixels.) For example, the block in the second row and third column will be addressed as the (2,3) block and said to have located at (2, 3) There will be in all M/W rows and M/W columns, and in all M×M/(W×W) blocks. The pixel (i,j) belongs to ($\lfloor i/W \rfloor$, $\lfloor j/W \rfloor$) block; where $\lfloor x \rfloor$ is denotes the floor operation.

Given a block, a neighborhood criterion defines the set of blocks in the same image which are considered as the "neighboring" blocks for the given block. In a preferred embodiment of the system, a block A located at (i,j) and block B located at (k, l) are considered to neighbors if the Euclidean distance between them is less than a threshold function. In a more preferred embodiment of the system, the threshold function is a constant function.

Figure 6D:
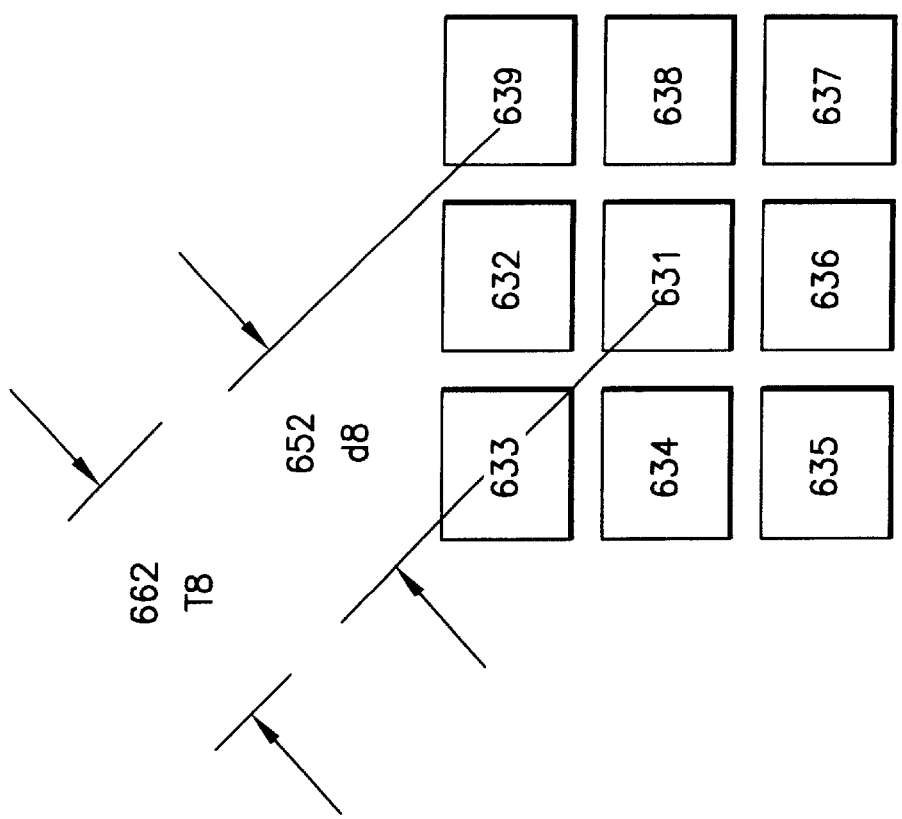
Figure 6C:
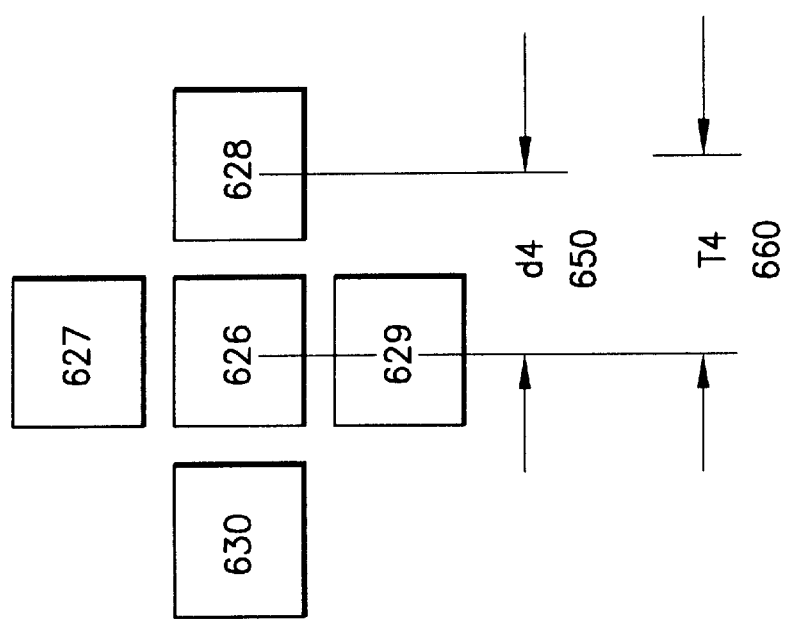

In FIG. 6C (4-neighbor function), for block 626, the blocks immediately north (626), south (629), east (628), and west (630) to it are considered to be its neighbors. For instance, the distance, d4 650, between the center of the pixels 626 and 628 is less than the threshold distance, T4 660.

In FIG. 6D (8-neighbor function), for block 631, the blocks immediately north (632), northwest (639), east (638), southeast (637), south (636), southwest (635), west (634), northwest (633), north (632) to it are considered to be its neighbors. For instance, in the 8-neighbor case, the diagonal distance, d8 652, between the center of the pixels 631 and 639, is less than the threshold distance T8 661. In a preferred embodiment, 8-neighborhood neighborhood function was used.

In a preferred embodiment, a distance T4 660 is set between 1.1 blocks (pixels) and 1.4 blocks (pixels) and more preferably to 1.1 blocks (pixels). In a preferred embodiment, a distance T8 661 is set between 1.5 blocks (pixels) and 2 blocks (pixels) and more preferably to 1.1 blocks (pixels).

Figure 4:
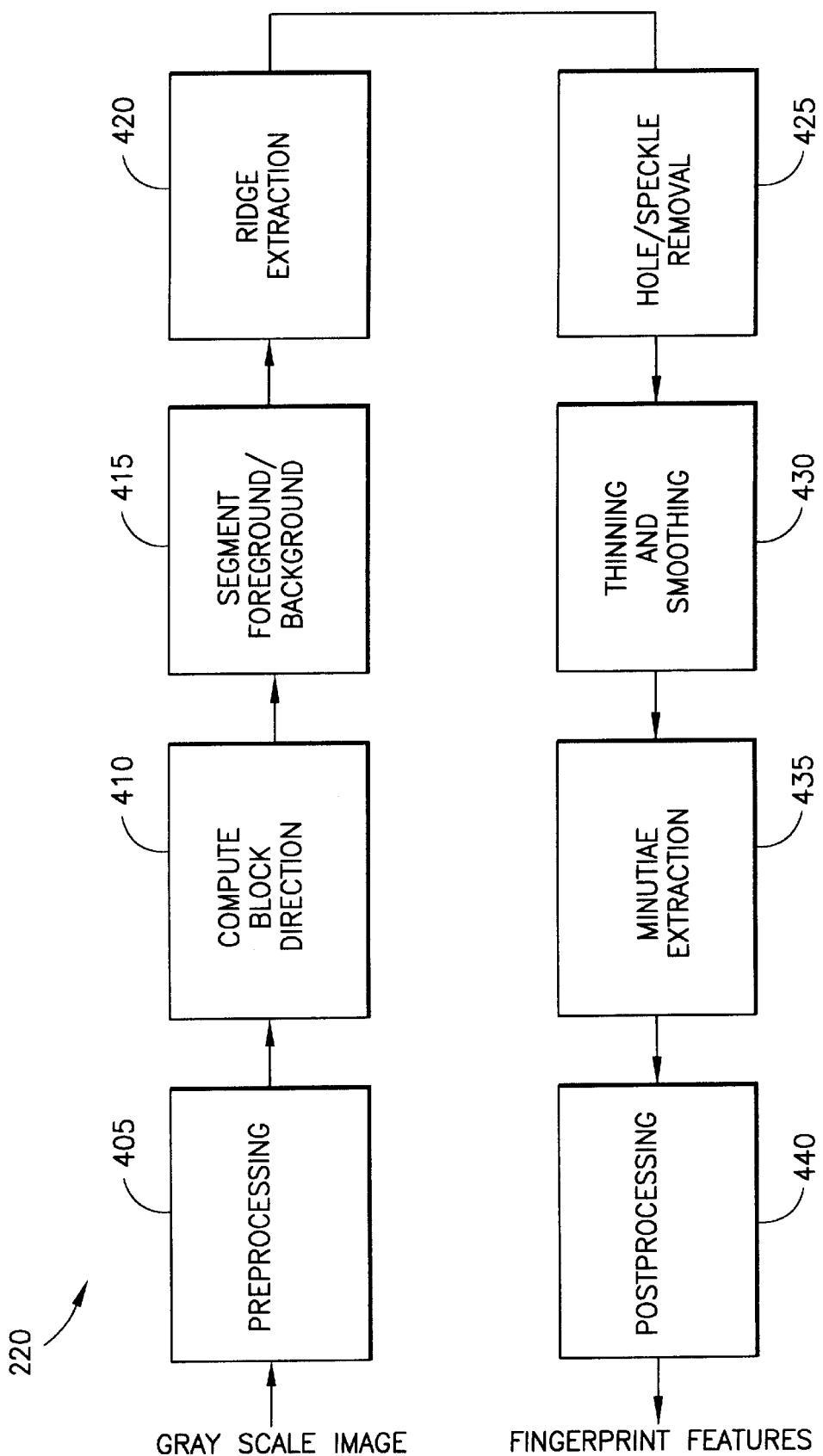
FIG. 4 illustrates a flow chart showing the steps performed by the improved feature extraction process.

Now refer to the novel fingerprint feature extraction process 220 shown as a flowchart in FIG. 4.

Figure 3A:
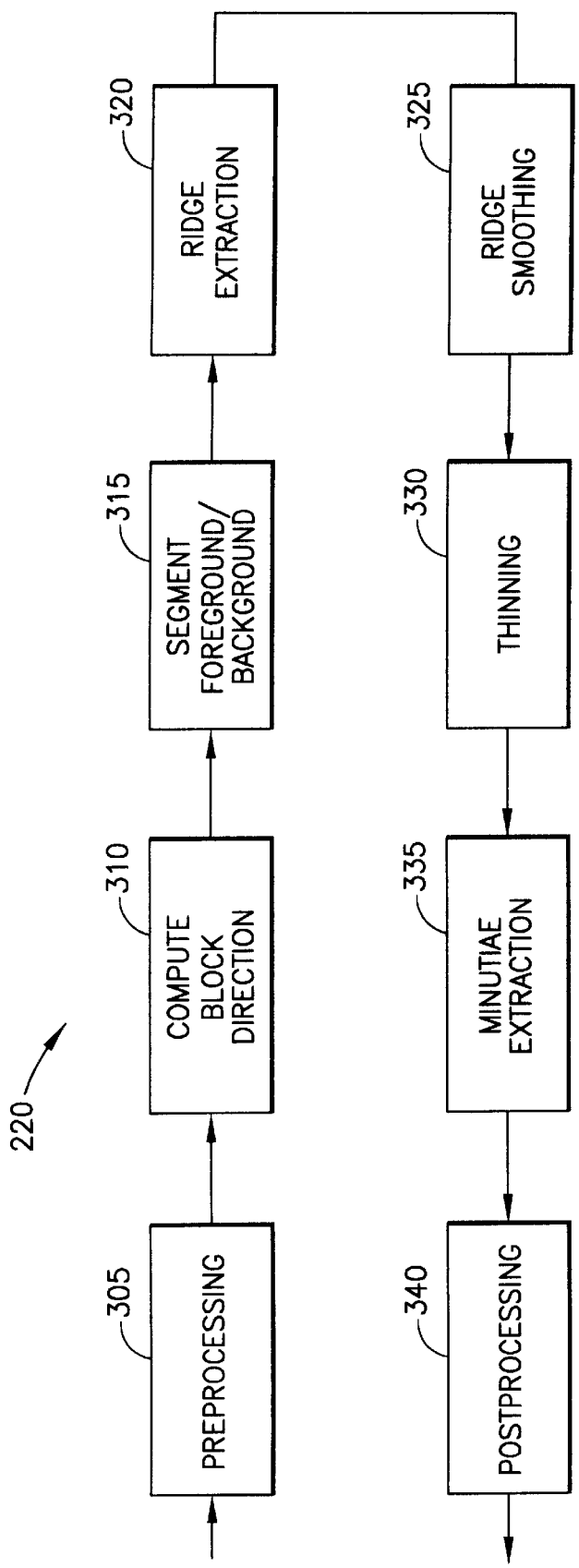
FIG. 3A is a flow chart showing the prior art steps performed by a feature extraction process.
Figure 3B:
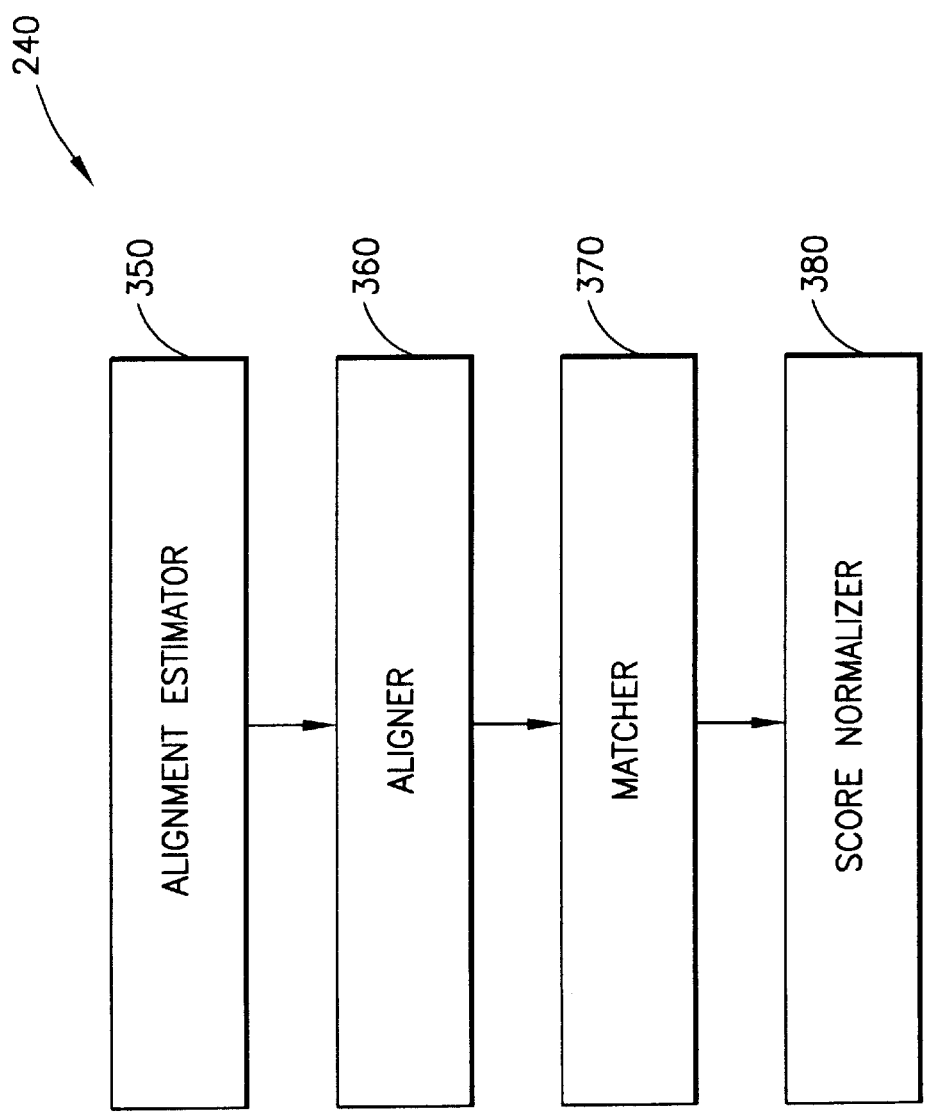
FIG. 3B is a flow chart showing the prior art steps performed by a feature matching system.

Step 405 is prior art block smoothing algorithm which smooths the input fingerprint gray scale image. See description of block 305 above in FIG. 3A. In additions blocks 425, 430, 435, and 440 are prior art steps as described in blocks 325, 330, 335, and 340 of FIG. 3A, respectively. Steps 410, 415, and 420 are novel and describe below.

Referring now to FIG. 5, there is shown the block diagram representation of a general computer hardware environment that is used as the image processing system 500. This computer 510 may be one of International Business Machines Corporation (IBM) Personal System/2 (PS/2) family of Personal Computers, a RISC System/6000, or Power Parallel System (SP/x), or equivalent. The system 500 includes one or more central processing units (CPU) 515, which may conform to any general computer architecture (e.g., Intel or a reduced instruction set microprocessor.) The CPU 515 is attached to a system bus (not shown) to which are attached a read/write and/or random access memory (RAM) 520 that can include one or more cache memories, a read only memory (ROM) 540, and an input/output adapter 525. The RAM 520 provides temporary storage for one or more application program processes 600 containing code and/or data while the ROM typically includes the basic input/output system (BIOS) code. A disk memory 530, e.g., Direct Access Storage Devices (DASDs), here represented by a hard disk drive 530, are also connected to the CPU by an appropriate adapter (not shown.) The hard disk drive 530 typically stores the computer's operating system (OS), such as IBM's OS/2 operating system, and various application programs, data, and/or databases. These databases include intermediate results and fingerprint image data 535. Typically, the input/output adapter 525 has attached to it a keyboard 527, a mouse 528, and/or other user interface devices (not shown).

The system 500 also can include a display 538, here represented as a cathode ray tube (CRT) display but which may be a liquid crystal display (LCD) or other suitable display and/or graphic user interface (GUI) 538. The display 538 is connected to the system bus via a display adapter.

The computer 510 is also interfaced with a framegrabber 550 and an image acquisition device, e.g., a camera 560 along with imaging subsystem to capture a livescan fingerprint image onto the computer memory/disk. Alternatively, the computer might be communicating with a document scanning device 565 that scans the fingerprint image from a document like an inked fingerprint card 570. Any other known means can be used to enter a fingerprint image to the memory 535, e.g., transmitting an image over a network 566 from another equivalent system 510A.

The hardware for system 500 and equivalents of these systems are well known to those skilled in the art.

Personal System/2, PS/2, OS/2, RISC System/6000, Power Parallel System, SP/x, and IBM are trademarks of the International Business Machines Corporation.

The objective of the block direction computation, step 410, is to determine the orientation of the ridge flow in each block. This process 410 is described in FIG. 7. The process 410, computation of the block directions consists of the two steps: (i) estimation of brightness gradients at each pixel 710, and (ii) estimation of block orientation directions 720.

In the preferred embodiment of the system, the measurement, the direction of gradient of the intensity (brightness) at a pixel is defined as the direction in which there is the steepest change in intensities at that pixel. The magnitude of the gradient at a pixel is determined by the amount of change in intensities at that pixel. The block orientation at a pixel is defined as the direction in which there is the least change in the intensities. Note that overall gradient direction below is orthogonal to the block directions.

The process of computation of brightness gradients consists of two steps: (a) computation of X-gradient 711 at each pixel in each block; and (b) computation of Y-gradient 712 at each pixel in each block. X-gradient of the brightness a measure of quantifying the rate of change of brightness in X-direction. There are several methods of measuring the X-gradient. In a preferred embodiment of the system, the X gradient 711 is computed using the 3×3 X-Prewitt Operator as below:

$$g_x(i, j) = g(i-1, j-1) + g(i, j-1) +$$
$$g(i+1, j-1) - g(i-1, j+1) -$$
$$g(i, j+1) - g(i+1, j+1)$$

$g_x(i,j)$ refers to the x-gradient of the brightness at pixel $(i,j)$.

Y gradient of the brightness a measure of quantifying the rate of change of brightness in Y direction. There are several methods of measuring the Y gradient. In the preferred embodiment of the system, the Y gradient 712 was computed using the 3×3 Y-Prewitt Operator as below:

$$g_y(i, j) = g(i-1, j-1) + g(i-1, j) +$$
$$g(i-1, j+1) - g(i+1, j-1) -$$
$$g(i+1, j) - g(i+1, j+1)$$

$g_y(i,j)$ refers to the y-gradient of the brightness at pixel $(i,j)$. See
Robert M. Haralick and Linda G. Shapiro, Computer and Robot Vision, Chapter 7, Section 7.4.1, pp 338–339,
which is herein incorporated by reference in its entirety.

Note that the X- and Y-Prewitt operators measure brightness gradients of the image at a pixel in X and Y directions, respectively. The overall magnitude of the brightness gradient can then be measured from the X and Y brightness gradient values by taking Euclidean norm of the X and Y brightness gradient values:

$$g(i, j) = \sqrt{g_y^2(i, j) + g_x^2(i, j)}$$

The overall direction of the brightness gradient can be measured from the ratio of X and Y brightness gradient values:

$$\phi(i, j) = \tan^{-1} \frac{g_y(i, j)}{g_x(i, j)}$$

However, both magnitude and orientation of the gradient vector thus estimated is not very reliable since the raw individual gradient values are noisy. In order to obtain a reliable representative estimate of the orientation of the gradient in a given block, a consensus of a number of measurements of X- and Y-gradients at different pixels in that block needs to be assessed. The prior art (Rao and Jain reference) obtain an estimate of the representative orientation in a given fixed block by first obtaining mean 180-degree invariant X- and Y-gradients from the raw unprocessed X- and Y-gradients at each pixel in the block. The representative orientation can then be obtained for the given block by relative strengths of the mean 180-degree invariant X- and Y-gradients.

Figure 8:
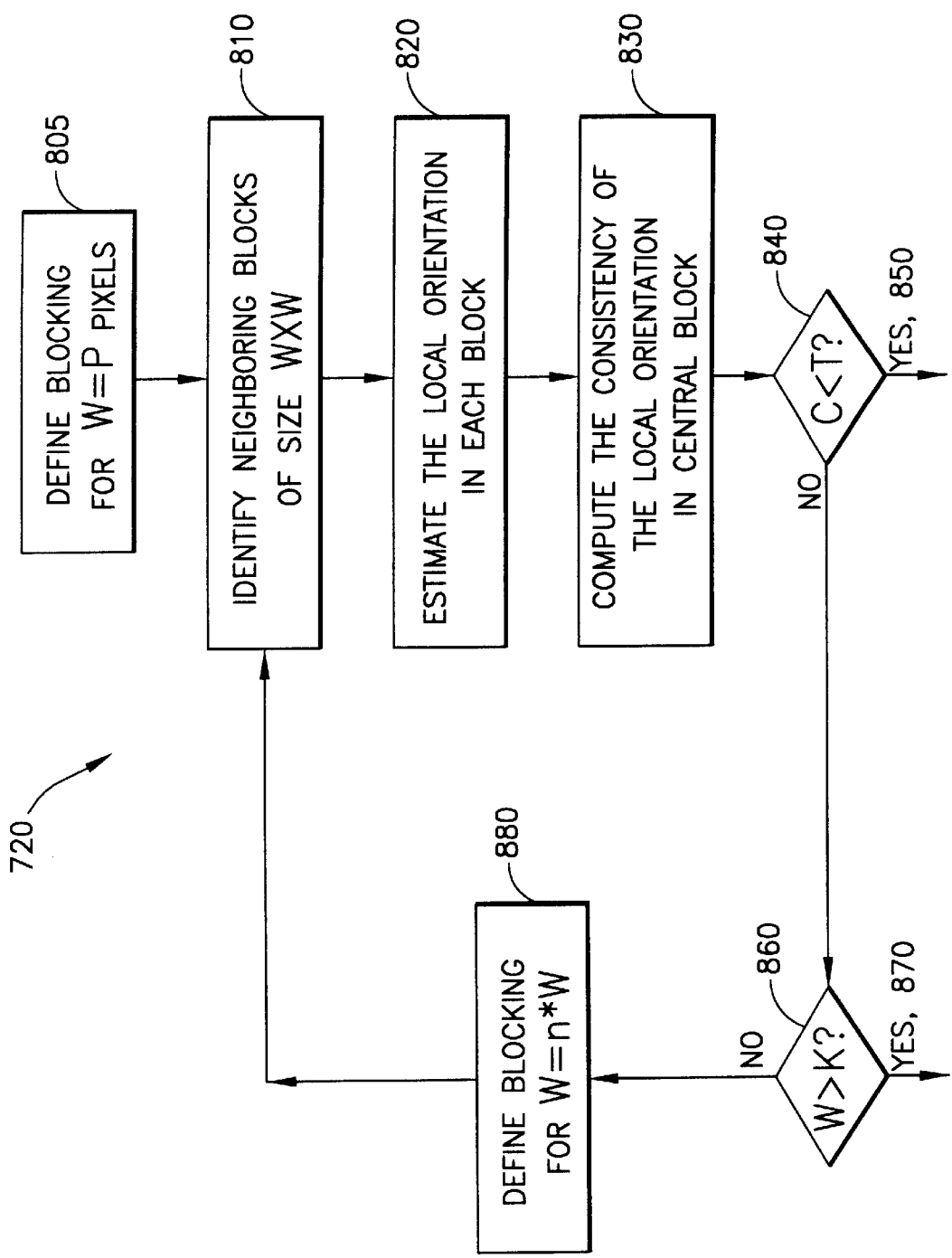
FIG. 8 is flowchart showing the steps performed in hierarchical orientation (step 720) in FIG. 7.

The flowchart for the novel process 720, further described in FIG. 8, determines how large a new block (or region) needs to be to determine a reliable consensus for estimating representative orientation for a given region (block). In other words, the process 720 determines which pixels within a region both within the given block and lying outside of the given block will be used to determine the given block orientation. Here the region is determined by a new block that contains the given block but is larger in size up to a predetermined size.

This process determines if the orientation estimated for a given block is consistent with the orientation of the neighboring blocks. If the given block orientation is consistent, the estimate is accepted and used as the orientation of the given block. If the given orientation is inconsistent with the orientations of its neighboring blocks, the orientation estimation of the given block is redetermined. This redetermination is done by increasing the size of the given block, determining neighbors for this new block, determining the orientation of the new block and neighboring blocks and determining if the orientation of the new block is consistent with the orientation of the new neighbors. In other words, the block size of the given block is increased and the process steps 810, 820, 830, 840, 860, and 880 are repeated. If the new block orientation is consistent with the orientation of the new neighbors, the orientation of the new block is used as the orientation of the given block. If not, the process is repeated until the new block becomes larger than a predetermined size.

In step 810, for given blocking scheme, neighboring blocks for the current block are identified. In a preferred embodiment, the 8-neighboring function is used. See FIG. 6D.

In step 820, an estimate for determining the local orientation is computed for the current (given) block and the neighboring blocks using the brightness gradients computed in step 710. Any of the methods for orientation estimation described in the Rao and Jain, Kawagoe and Tojo, Mehtre et al., or Kass and Witkin could be used.

In a preferred embodiment, Rao and Jain method of orientation estimation was used for computing the estimate of the orientation at a given (current and neighboring) blocks.

The prior art (Rao and Jain reference) obtain an estimate of the representative orientation in a given fixed block by first obtaining mean 180-degree invariant X- and Y- gradients from the raw unprocessed X- and Y-gradients at each pixel in the block.

More specifically, mean 180-degree invariant X-gradient $V_x(i,j)$ and Y-gradient $V_y(i,j)$ the given region are computed as follows:

$$V_x(i, j) = \sum_{(u=i-\frac{W}{2})}^{(i+\frac{W}{2})} \sum_{(v=j-\frac{W}{2})}^{(j+\frac{W}{2})} 2 \times g_x(u, v) \times g_y(u, v)$$

$$V_y(i, j) = \sum_{(u=i-\frac{W}{2})}^{(i+\frac{W}{2})} \sum_{(v=j-\frac{W}{2})}^{(j+\frac{W}{2})} 2 \times (g_x^2(u, v) - g_y^2(u, v))$$

The representative orientation can then be obtained for the given block by relative strengths of the mean 180-degree invariant X- and Y-gradients.

More specifically, the representative orientation of the gradient θ(i,j) can be obtained as:

$$\theta(i,j) = 1/2 \tan^{-1} \frac{V_y(i,j)}{V_x(i,j)},$$

where W is the size of the local window; $g_x$ and $g_y$ are the gradient magnitudes in x and y directions, respectively.

In step 830, the (in)consistency level of the orientation of the current block with respect to the orientations of its neighbors. These orientations were determined in step 820. Note that the neighboring blocks do not have inconsistency measurements until they are current blocks.

In a physical sense, the (in)consistency level is a metric of the difference in orientation (or angle) between the orientation of the current block and the orientations of its neighboring blocks. In a preferred embodiment, this metric is described by the root mean square of each of the differences between the orientation of the current block and the orientation of any given neighboring block.

In a preferred embodiment, the (in)consistency level of the orientation estimated at the current block is estimated using the following formula:

$$C(i,j) = \frac{1}{N} \sqrt{\sum_{(i',j') \in D} \|\theta(i',j') - \theta(i,j)\|^2},$$

θ'−θ=d if d=((θ'−θ+360) mod 360) <180 otherwise

θ'−θ=d−180 where D represents the local neighborhood around the block (i,j). N is the number of blocks within D; θ(i',j') and θ(i,j) are local ridge orientations at blocks (i',j') and (i,j), respectively. In preferred embodiment of our system, the size of D is in the range between 3×3 to 7×7 square pixels, preferably 5×5 square pixels.

In step 840, it is determined whether or not the (in) consistency level of the orientation at the current block is verified to be within an acceptable range. In the preferred embodiment, this is accomplished by checking if the (in) consistency level at the current block (i,j) is less than a certain consistency threshold Th, then the most recent estimate of the orientation at the current block (as computed in step 820) is deemed to be accurate and taken as the final estimate of the orientation of the current block (step 850). Otherwise, the estimate of orientation of the current block is rejected and the control of flow goes to step 860.

If the estimate of orientation of the current block is rejected, the size of the current block is checked. In a preferred embodiment, if the block size is large, no orientation of the current block is made. However, if the size of the current block is within a certain limit, the block size is increased and the orientation estimation process (specifically steps 810, 820, 830, and 840) are repeated.

In step 860, the current block size is verified to be within a certain limit K. In the preferred embodiment, K is within range on 32 to 128 pixels and more preferably set to 33 pixels. If W is not greater than K then the flow control is passed to step 880. Otherwise, the most recent estimate of the orientation at the current block as computed in step 820 is deemed to be unreliable yet final estimate of the orientation at current block.

If the final estimate of the orientation of the current block is found unreliable, alternative preferred embodiments exist:

1. the unreliable estimate is accepted and used.
2. the pixels belonging to the entire current block are treated as background pixels.

In step 880, the image is regrouped into a new blocking scheme with W=n×W. In other words, the size of the current block (and all neighboring blocks, later in step 810) is increased by a factor of n on each side (the area is increased by $n^2$). In the preferred embodiment, n is in the range between 1 and 2 and more preferably n=2. The control of flow then returns to step 810 to identify the new neighbors.

In some imaging systems, the foreground of an image is the area of interest. The foreground/background segmentation module of this invention identifies the region of interest, e.g., the region of image depicting the finger.

Referring back to the flowchart in FIG. 4, a novel foreground/background segmentation system and method 415 is described. FIG. 9 is a flow chart showing the detail steps of foreground determination 910 and connected component analysis 920 that comprise of this foreground/background segmentation module 415. In a preferred embodiment, the foreground/background segmentation is used to identify the portion of a digital image depicting the fingerprint.

In step 910, each block is analyzed to verify if it is a a foreground block. This determination is based on the certainty level of the orientation field at various locations in the image. Higher the certainty level, the more likely a particular location is in the foreground of the image. On the other hand, the lower the certainty level, the more likely a particular location is in the background of the image. See steps 1040, 1050, and 1060 in FIG. 10.

The certainty level of the orientation field at a current block (i,j) is a relationship between: 1. some estimated metric of the overall gradient magnitude and 2. some estimate of an overall projected gradient magnitude.

The overall gradient magnitude is a measure of the amount of intensity variation in the current block. For example, the intensity variation between a first white colored pixel and an adjacent black colored pixel is high but between a light grey pixel and an adjacent slightly darker grey pixel is low. The overall gradient magnitude is an indication of all of these intensity variations over the entire current block.

The overall gradient direction is a measure of direction in the current block for which the maximum intensity variation in the current block is greatest (or alternatively least). The overall gradient direction is orthogonal (or alternatively parallel) to the respective block direction. For example, for each pixel in the current block there is a direction, defined by gx and gy, along which the intensity variation is maximum (alternatively minimum). The overall gradient direction is an indication of all of these directions for all pixels in the entire current block.

The overall projected gradient magnitude is a measure of the vector component contribution of the overall gradient magnitude in the overall gradient direction. If a large number (or all) of the pixels have a direction that is the same as the overall gradient direction, the projected gradient magnitude will be nearly equal (will be equal) to the overall gradient magnitude. This indicates that the current block is a block in the foreground of the image. For example, if the current block has a block size, as determined above, that includes one or more fingerprint ridges in a given direction, then the projected gradient magnitude will be nearly equal to the overall gradient magnitude. However, if the pixels in the current block have little variation in their intensity and have random directions, the projected gradient magnitude will be small compared to the overall gradient magnitude indicating that the current block does not include any foreground in the image, i.e., the current block is in the background.

In the preferred embodiment, the overall gradient magnitude is the magnitude of the gradient that is a vector sum of the gradient vectors (e.g., defined above) at each pixel in the block. The overall projected gradient magnitude is the magnitude of the sum of the projections of all the gradient vectors at each pixel in the block upon the orientation of the block.

In a preferred embodiment, the relationship between over gradient magnitude and the overall projected gradient magnitude is the ratio of the overall gradient and the overall projected gradient magnitudes.

More specifically, certainty level of the the orientation field at a current block (i,j) is defined as follows:

$$CL(i, j) = \sqrt{\frac{1}{(W \times W)} \frac{V_x(i, j)^2 + V_y(i, j)^2}{V_e(i, j)}} \quad \text{where}$$

$$V_e(i, j) = \sum_{u=i-\frac{W}{2}}^{u=i+\frac{W}{2}} \sum_{v=j-\frac{W}{2}}^{v=j+\frac{W}{2}} (g_x^2(u, v) + g_y^2(u, v))$$

and W is the size of a local neighborhood.

Note that the overall gradient magnitude and overall projected gradient magnitude can be monotonic functions of the above, e.g., logarithms or roots of the overall gradient magnitude and overall projected gradient magnitude.

Figure 10:
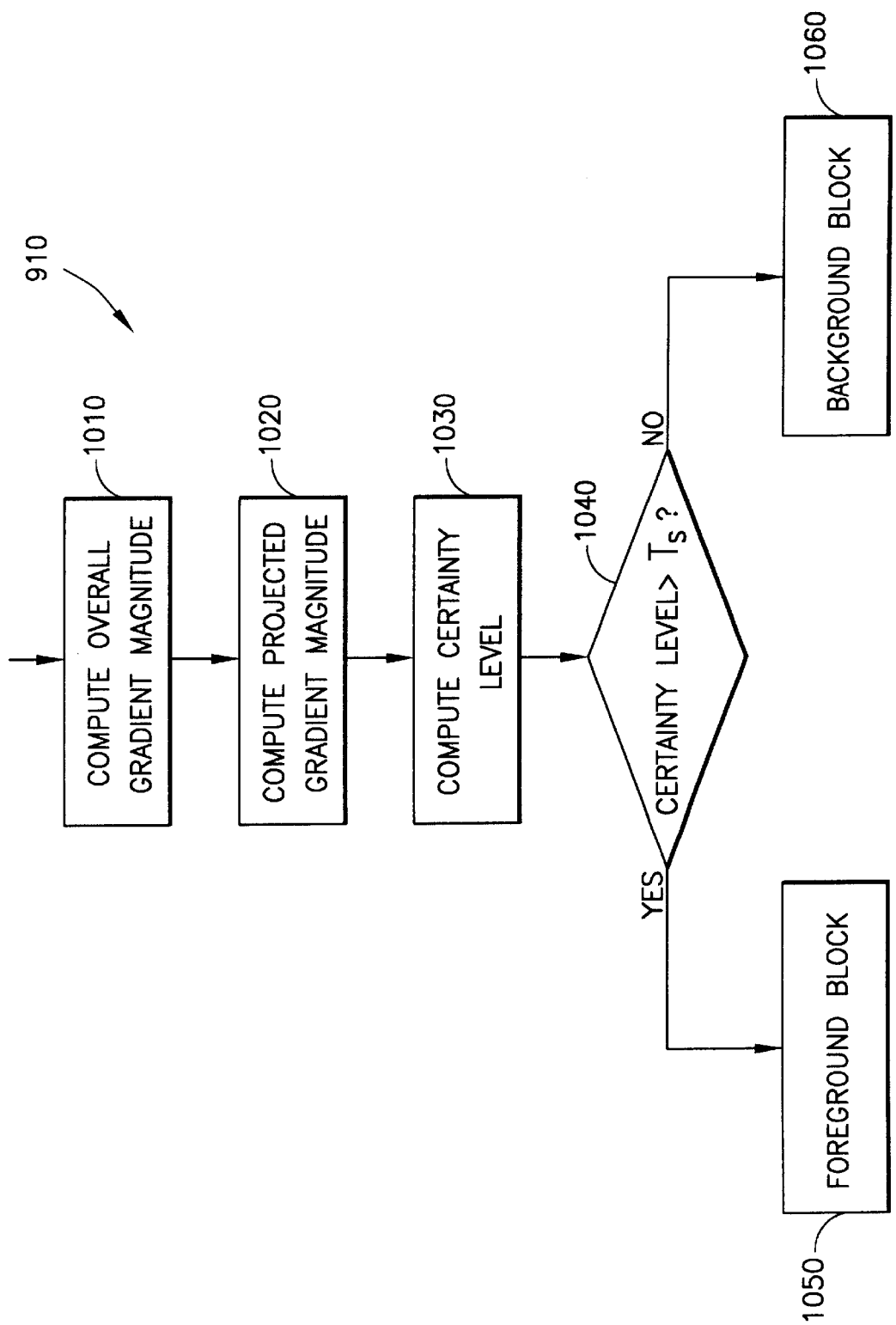
FIG. 10 is a flowchart showing the steps performed in segmentation process.

FIG. 10 illustrates the flow chart of the steps performed in the blockwise segmentation process (step 910) for one block. For a given block, overall gradient and overall projected gradient magnitudes are computed in step 1010 and 1020, respectively. In step 1030, certainty level for the block is computed by taking the ratio of the overall gradient and the overall projected gradient magnitudes. In step 1040, the certainty level of a block is compared with a threshold value $T_s$. If the certainty level of the orientation field is below a certain threshold $T_s$, then the pixel is marked as a background pixel (step 1060). In a preferred embodiment the value of this threshold is between 80 and 120, more preferably 100.

Once the set of all foreground blocks is identified in step 910, in step 920, the connectivities of all the blocks (e.g., a set of foreground blocks belong to single connected region comprising of foreground blocks) is determined using a connected component analysis based on Dana H. Ballard and Christopher M. Brown, Computer Vision, 1982, Prentice-Hall, Inc., Englewood Cliffs, N.J. 07632 of which the relevant portions of chapter 5 are herein incorporated by reference in its entirety.

The largest component among the all the foreground components is used as the foreground region and rest of the regions are discarded (considered as background).

For completeness a description is given below that is described in more detail in U.S. Patent Application, entitled SYSTEM AND METHOD FOR EXTRACTING RIDGES OR VALLEYS (FINGERPRINT) IMAGES, by the same inventors, and filed the same day as this application, and further which is incorporated by reference in its entirety.

In step 420, location of ridges are identified among the foreground blocks or regions extracted by the step 415. This step uses the preprocessed input gray-scale fingerprint image resulting from step 405 and the block directions computed in step 410. However, the process describe in detail below can generally be applied to any intensity images of tubular structures regions, e.g., ridges or valleys, in any image produced by light, general electromagnetic energy, ultrasound, or any other energy used in imaging systems.

An important property of ridges (valleys) produced by tubular structures in images, and in particular in fingerprint images, is that the gray level values on ridges (valleys) attain their local minima, e.g., more black (maxima, e.g., more white) along a direction non-parallel (e.g., orthogonal) to the local ridge orientation.

Figure 11:
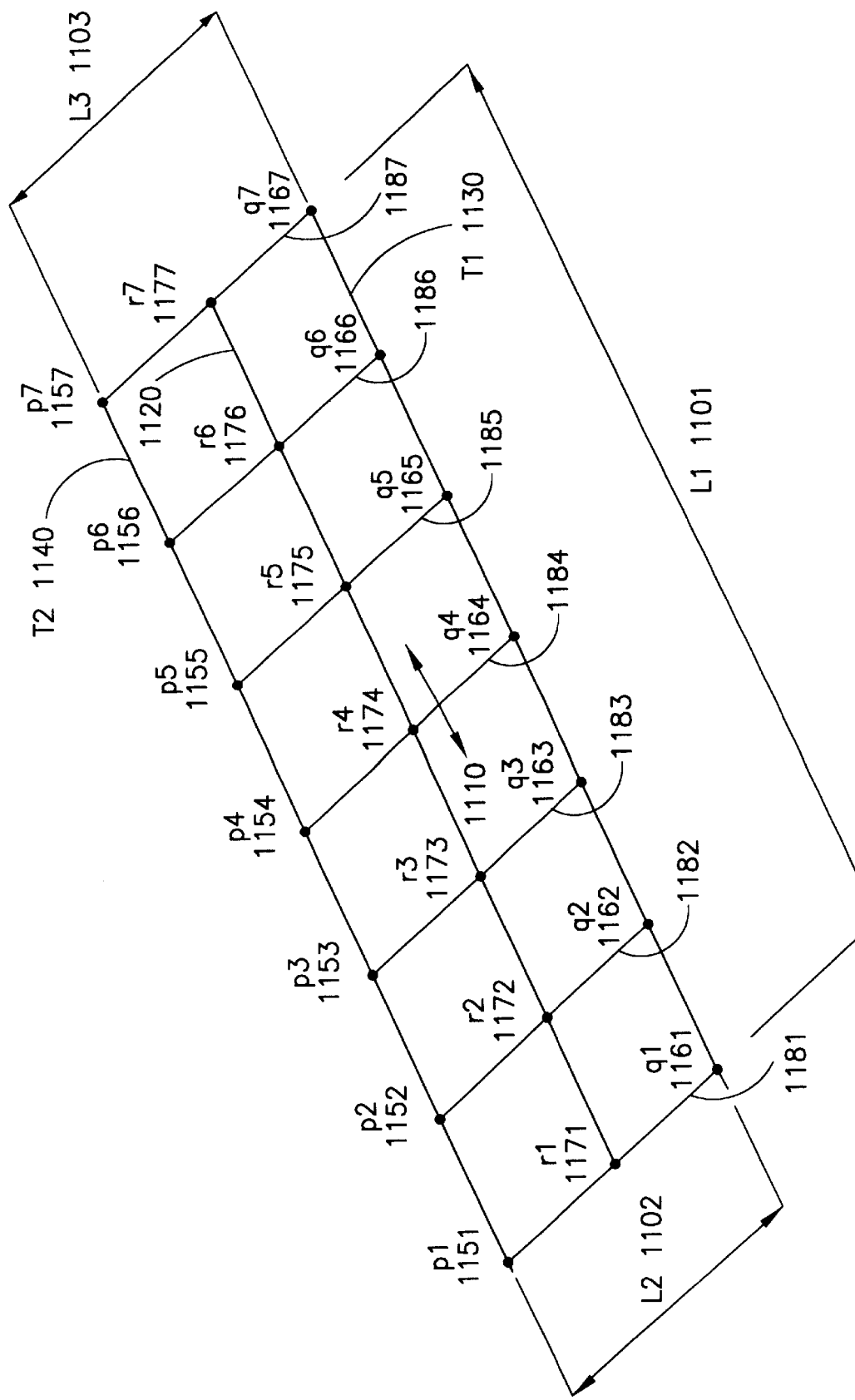
FIG. 11 illustrates the test line, pixel line, and traverse lines used fro ridge extraction process.
Figure 12:
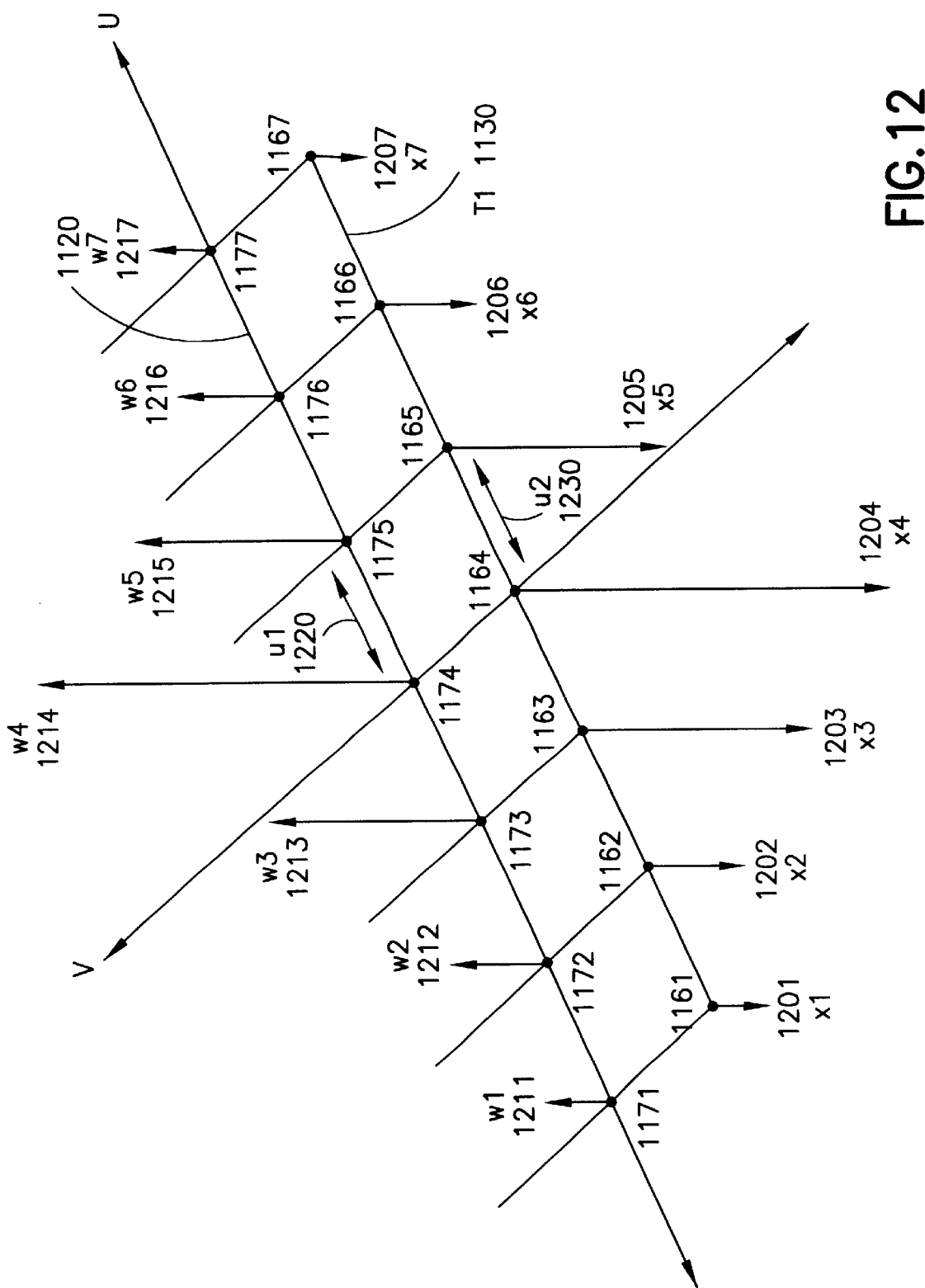
FIGS. 12 and 13 show the weights associated with the test and line pixels.

Refer to FIG. 11. In one preferred embodiment of the system detecting ridges (valleys), the following method is used for identifying ridge pixels: At a given pixel, called a current line pixel r4 1174, a vector of intensity values is composed using values of intensities of the pixels of the original (fingerprint) image along a digital line segment 1184 of length L3 1103 centered on the given pixel r4 1174 and non-parallel (e.g., orthogonal) to block direction 1110 at that pixel r4 1174. If the intensity value attains minimum (maximum) at the center point of the vector, the pixel is identified as the ridge (valley) pixel.

This method of extracting ridges (valleys) can often identify spurious pixel locations as ridge (valley) pixels due to several reasons, e.g., noisy fingerprint imaging, noisy grey levels due to insufficient contact between the finger and imaging surface.

Therefore, a more preferred embodiment of system uses the following novel decision process for identifying the ridge (valley) pixels (see FIGS. 11, 12, 13, 14). In this process, ridges (valleys) are identified where the gray levels on the center of a ridge (valley) are consistently lower, e.g., more black (higher, e.g., more white) than the grey levels of the pixels located on the periphery of the ridge (valley).

The method described the flowchart in FIG. 14, below, hypothesizes that a pixel (current line pixel r4 1174) is indeed located on the ridge (valley) center. To confirm/reject the hypothesis of the current line pixel r4 1174 is a ridge/valley pixel, the process needs to identify a set of nearby pixels referred to as line pixels (e.g., r1–r7 1171–1177) and one or more sets of test pixels (e.g., p1–p7 1151–1157 and/or q1–q7 1161–1167). The intensity values of the line pixel set (e.g., r1–r7 1171–1177) and the test pixel set(s) (e.g., p1–p7 1151–1157 and/or q1–q7 1161–1167) determine whether the current line pixel r4 1174 is located at the center of a ridge/valley. The details of determination of the line pixel set and test pixel set(s) is first described below and is followed by a description of one preferred embodiment statistical test used for validating or rejecting ridge/valley pixel hypothesis.

Pixel line 1120 is determined by a digital line segment of length L1 1101 parallel to the block direction 1110 through the current line pixel r4 1174 and preferably centered on the current line pixel r4 1174.

A N1 number of pixels (e.g., r1–r7 1171–1177) are sampled on the pixel line 1120, preferably equidistant from each other and preferably centered around the current line pixel r4 1174. These pixels (e.g., r1–r7 1171–1177) will be referred to as line pixels. In a preferred embodiment, the value of N1 is between 10 to 12 and more preferably 11.

Length of L1 1101 determined as a compromise between two factors: sensitivity of the ridge extraction algorithm 420 to the curvilinear ridges and robustness of the ridge extraction method 420 to local noise in the gray levels of the ridges. Larger values of L1 1101 will make it difficult to detect very curved ridges, e.g., near core of some fingers but less sensitive to the spurious variations in the gray levels of the fingerprint image. Smaller values of L1 1101 will have an opposite effect. In a preferred embodiment, the value of L1 1101 is chosen between 10 to 12 pixels and more preferably 11 pixels.

One preferred method of determination of test pixel set(s) can be described as follows: One or more test (T1 1130, T2 1140) lines are identified on one or both side(s) of the pixel line 1120. The test lines (T1 1130, T2 1140) can be on just one side of the test pixel line 1120 or on opposite sides of the pixel line 1120. In a preferred embodiment, two test lines (T1 1130, T2 1140) are selected, one on each side of the pixel line 1120. The test lines (T1 1130, T2 1140) are parallel to the pixel line 1120, i.e., also in the direction of the ridge/valley or block direction 1110. While each of these test lines can be at any respective distance (less than ½ of average width of the ridges/valleys) from the pixel line 1120, it is preferred to place the test lines (T1 1130, T2 1140) one each on opposite sides of the pixel line 1120 at equal distances from the pixel line 1120. In one preferred embodiment, two test lines (1130, 1140) were placed at a distance half the distance L2 from the pixel line 1120 and on opposite sides of the pixel line 1120. The preferred value of length L2 1102 is should be less than average ridge/valley width of a population. More specifically, value of L2 1102 is set between 6 to 8 pixels, and preferably to 7 pixels.

One or more digital line(s) can now be identified, each preferably centered on a line pixel (e.g., r1–r7 1171–1177) non-parallel to the pixel line 1120, and of length L2 1102. Each of these lines is referred to as traverse lines, e.g., 1181, 1182, 1183, 1184, 1185, 1186, and 1187. In a preferred embodiment, the traverse lines are orthogonal to the pixel line.

A set of N1 test pixels can now be sampled from each test line (e.g., T1 1130, T2 1140) at the intersection of each traverse line (e.g., 1181, 1182, 1183, 1184, 1185, 1186, and 1187) with each of the test lines, e.g., test pixel set (p1–p7 1151–1157) can be sampled from test line T2 1140 and/or test pixel set (q1–q7 1161–1167) can be sampled from test line T1 1130.

The hypothesis of the given pixel (current line pixel) r4 1174 being at center ridge (valley) pixel is confirmed (or rejected) based on a comparison of a statistic of the population intensity levels of line pixels (e.g., r1–r7 1171–1177), including the current line pixel r4 1174 and the test pixels (e.g., p1–p7 1151–1157 and/or q1–q7 1161–1167). If the given statistic of the intensity values of line pixels (e.g., r1–r7 1171–1177) is lower (higher) than the same statistic of all of the set of test pixels (p1–p7 1151–1157 and/or q1–q7 1161–1167) the given pixel r4 1174 is determined to be central ridge (valley) pixel.

In a preferred embodiment, a current line pixel r4 1174 is considered to be ridge (valley) pixel based on a weighted average statistic which is used to determine whether the line pixels are consistently darker (brighter) than the test pixels. The weights associated with line pixels (e.g., w1–w7 1211–1217 weights for line pixels r1–r7 1171–1177, respectively) are positive and the weights associated with the test pixels (e.g., z1–z7 1301–1307 for test pixels p1–p7 1151–1157, x1–x7 1201–1207 for test pixels q1–q7 1161–1167, respectively) are negative. Further, the magnitude of the weight associated with a test pixel (e.g., weight x5 1205 with test pixel q5 1165, weight z5 1305 with test pixel p5 1155) is inversely proportional to the distance (u2 1230, u4 1320) of the respective test pixel from the corresponding center test pixel (q4 1164, p4 1154). The magnitude of the weight associated with a line pixel is inversely proportional to the distance (u1 1220, u3 1330) of the line pixel 1175 from the current line pixel (r4 1174). In a more preferred embodiment, evidence generated by the test (line) pixels nearer to center test pixel (current line pixel) is considered significantly more important than the evidence generated by the test (line) pixels farther away. In one preferred embodiment, this importance of the evidence tendered by test (line) pixels closer to center test pixel (current line pixel) is reflected in the weights associated with a test (line) pixel, e.g., q5 1165 (r5 1175) decreasing exponentially with its distance, e.g., u2 1230 (u1 1220) from the corresponding center test pixel, e.g., q4 1164 (current line pixel r4 1174). More specifically, the magnitude of the weights are determined by the following exponential law:

$$w = \frac{1}{\sqrt{2\pi\delta}} e^{\frac{-u}{\delta^2}}$$

where $\delta$ is a parameter determining the rate of change of decrease in the magnitude of the weights with distance and u is the distance (e.g., u2 1230, u4 1320, u1 1220, u3 1330) of the given test (line) pixel e.g., q4 1165, p4 1155 (r4 1175) from the center test pixel (current line pixel), e.g., q4 1164, p4 1154 (r4 1174), respectively. The higher value of $\delta$, the less important is the brightness information tendered by the test (line) pixels farther away from their corresponding center test (line) pixels. In a more preferred embodiment, the value of $\delta$ was set between 5 to 15 and more preferably to 10.

Let the intensities of the pixels r1–r7 1171–1177 be g1–g7, respectively. Let the intensities of the pixels p1–p7 1151–1157 be f1–f7, respectively. Let the intensities of the pixels q1–q7 1161–1167 be h1–h7, respectively.

For each test line Ti (e.g., T1 1130), the following weighted summation Gi (e.g., G1) is performed: (i) intensities of line pixels Ri (e.g., g1–g7 intensities of r1–r7 1171–1177, respectively) weighted with respective weights Wi (e.g., w1–w7 1201–1207); the magnitude of each weight preferably as prescribed above; (ii) intensities of test pixels Qi (e.g., h1–h7 intensities of q1–q7 1161–1167, respectively) weighted with respective weights Xi (e.g., x1–x7 1201–1207); the magnitude of each weight preferably as prescribed above. Thus, the summation Gi is:

$$Gi = \sum_{i=1}^{N1} (Ri \times Wi) + \sum_{i=1}^{N1} (Qi \times Xi)$$

In case of T1 1130, the summation G1 can be expressed as:

$$G1 = \sum_{i=1}^{N1} (gi \times wi) + \sum_{i=1}^{N1} (hi \times xi)$$

Figure 13:
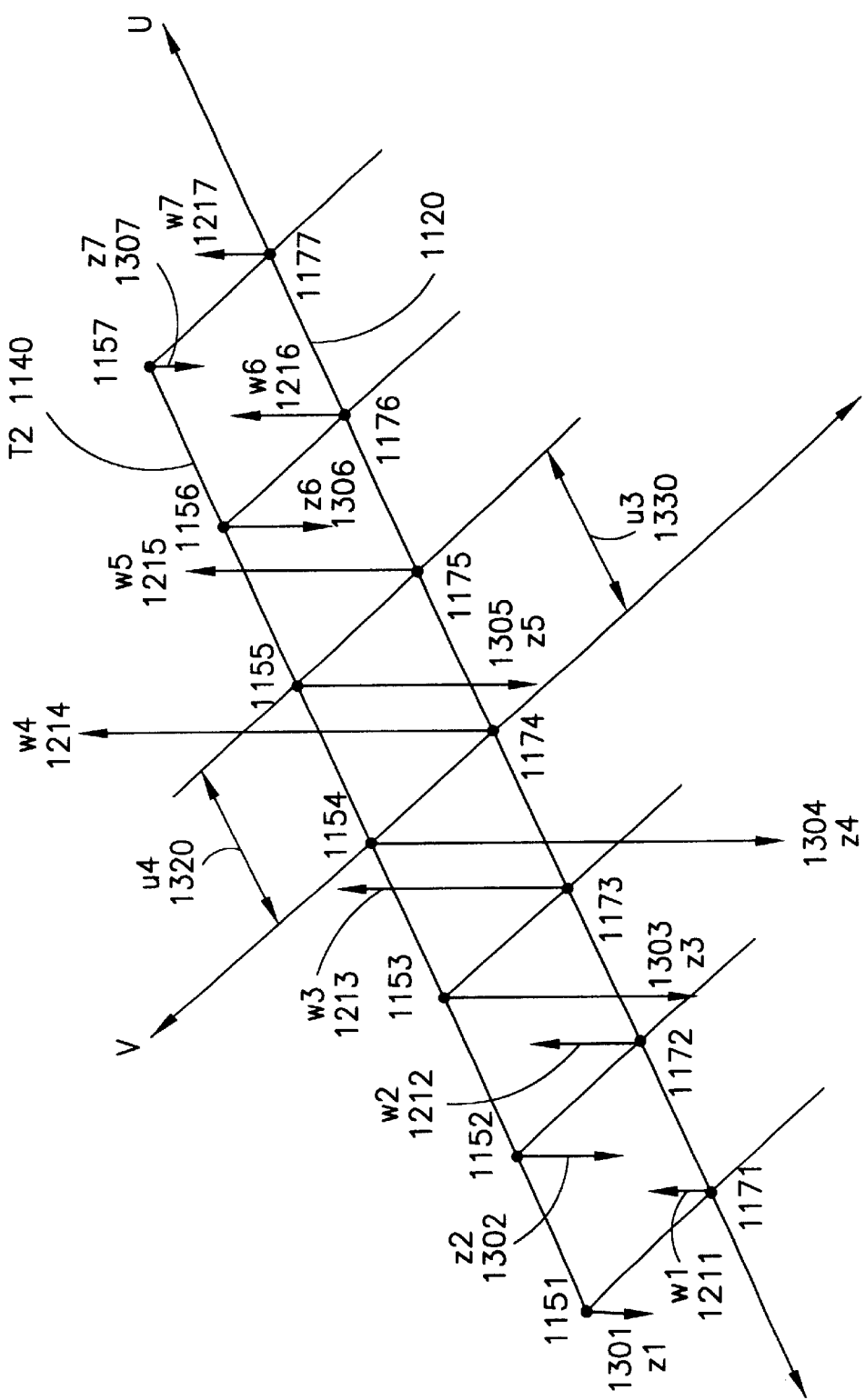

Another instance of the weighted summation is for test line T2 1140 is illustrated in FIG. 13: G2 is the weighted summation of: (i) intensities of line pixels g1–g7 intensities of r1–r7 1171–1177, respectively weighted with respective weights Wi (e.g., w1–w7 1201–1207); the magnitude of each weight preferably as prescribed above; (ii) intensities of test pixels f1–f7 intensities of p1–p7 1151–1157 weighted with respective weights z1–z7 1301–1307; the magnitude of each weight preferably as prescribed above. Thus, G2 is expressed as $$G2 = \sum_{i=1}^{NI}(gi \times wi) + \sum_{i=1}^{NI}(fi \times zi)$$

The weighted summations performed for the test lines left of the pixel line will be referred to as left weighted summations. The weighted summations performed for the test lines right of the pixel line will be referred to as right weighted summations. In order that a given pixel (current line pixel r4 1174) to categorized as ridge (valley) pixel, weighted summations (GL) performed for NL test line segments left of the pixel line 1120 (e.g., T2 1140) be negative (positive) and weighted summations (GR) performed for NR test line segments right of the pixel line 1120 (e.g., T1 1130) be negative (positive). Further, the magnitudes of all the summations are required to be greater than certain threshold R. In a preferred embodiment, the value of NR set between 1 and 3 and more preferably, to 1. In a preferred embodiment, the value of NL set between 1 and 3 and more preferably, to 1. The higher the value of R, the more stringent the test for the ridge/valley pixel. In a preferred embodiment, the value of R was set between 0 and 1, more preferably 0.

The flowchart showing steps performed in extraction of the ridges (valleys) in one preferred embodiment illustrated in FIG. 14. For each pixel as a current line pixel in the foreground, the weighted summation GL and GR are performed (steps 1410 and 1420). If the weighted summations GL and GR are both negative (positive) and their magnitude are greater than a threshold value R (step 1430), the given foreground pixel is determined to be a center ridge (valley) pixel (step 1450). Otherwise, it is considered to be valley (ridge) pixel (step 1440).

Note it is quicker to find the ridge (or valley) pixels and after all the ridge (valley) pixels are identified, the valley (ridge) pixels are determined from the pixels which are not ridge (valley) pixels and belong to the foreground area.

This concludes the description of ridge (valley) extraction process step 420.

Refer back to FIG. 4.

In step 425, holes and speckles are removed. Due to the presence of noise, dirt, breaks, and smudges, etc. in the input image, the resulting binary ridge map often contains holes (e.g., small fragments of genuine ridge that are not detected as ridges) and speckles (e.g., small spurious fragments detected as ridges). When ridge skeletons are used for the detection of minutiae, the presence of such holes and speckles will severely deteriorate the performance of the minutiae extraction algorithm because these holes and speckles may drastically change the skeleton of the ridges. Therefore, a hole and speckle removal procedure 425 needs to be applied before ridge thinning. 250 bytes. These recorded ridges are used for alignment in the minutiae matching stage described in the Patent application, entitled DETERMINING A POINT CORRESPONDENCE BETWEEN TWO POINTS IN TWO RESPECTIVE (FINGERPRINT) IMAGES, filed on the same day as this application, and herein incorporated by reference in its entirety.

The postprocessing step 440 culls the spurious minutiae detected in step 435 using any combination of the techniques described in in detail in the patent application Ser. No. 06/034,268, entitled "System and Method Using Minutiae Pruning for Fingerprint Image Processing", to Bolle et al.

There are several known methods of making the computation of smoothing (step 405), block direction field (step 410), foreground/background segmentation (step 415), ridge extraction (step 420), hole/speckle removal (step 425), thinning (step 430), minutiae extraction (step 435), and post-processing (step 440) more efficient by (i) by storing some computations in the buffers so that identical computation need not be reperformed; (ii) by parallelizing or pipeline the computations with no dependency and known dependency. All such methods are within the contemplation of the inventors.

The techniques described in this document are generally applicable for robust estimation of attributes of pixels or blocks. For instance, in a video consisting of a image sequence, one property of interest is how and which direction the objects depicted in the image frame are moving from one image frame to the next. The orientation of the pixel/block in such an application could refer to the direction movement determined a corresponding pixels/blocks in the successive image frames. Extending the invention described in this document to robustly estimate the block directions in a video image sequence is with the contemplation of the inventors.

The step 425 consists of four substeps (i) identifying unconnected ridge components; (ii) identifying unconnected valley components in the foreground area; (iii) converting the ridge components with size smaller than a threshold size $T_f$ to valley components and merging these new valley components with their surrounding valley components adjacent to them; (iii) converting the valley components with size smaller than a threshold size $T_b$ to ridge components and merging these new ridge components with their surrounding ridge components adjacent to them. In the preferred embodiment, $T_f$ was chosen in the range between 100 and 300 (square) pixels; more preferably, it was set to 256 pixels. In the preferred embodiment, Tb was chosen in the range between 10 and 50 (square) pixels; more preferably, it was set to 32 pixels. Steps (i) and (ii) requires the connectivity analysis of the ridge and valley pixels. These connectivities of the blocks using a connected component analysis based on Dana H. Ballard and Christopher M. Brown, Computer Vision, 1982, Prentice-Hall, Inc., Englewood Cliffs, N.J. 07632 of which the relevant portions of chapter 5 are herein incorporated by reference in its entirety.

Step 430 consists of two substeps (i) thinning several pixels wide ridge pixels to single pixel thickness. (ii) ridge smoothing. (i) The thinning algorithm in the following reference incorporated herein its entirety is used:

N. J. Naccache and Rajjan Shinghal, "An Investigation into the Skeletonization Approach of Hilditch", Pattern Recognition Journal, Vol. 17, No. 3, pp. 279-2

(ii) ridge smoothing: Minutiae detection is a trivial task when an ideal thinned ridge map is available. However, the presence of undesired spikes and breaks present in a thinned ridge map may lead to many spurious minutiae being detected. Therefore, before the minutiae detection, a smoothing procedure is applied after thinning procedure in step 430 to remove spikes and to join broken ridges. Our ridge smoothing algorithm uses the following heuristics: 1. If the angle formed by a branch and the trunk ridge is larger than $T_{lower}$ and less than $T_{upper}$ and the length of the branch is less than $T_{branch}$, then the branch is removed. 2. If a break in a ridge is shorter than $T_{break}$ and no other ridges pass through it, then the break is connected.

In the preferred embodiment, $T_{lower}$ is between the range of 50 to 90 degree and preferably 70 degrees. In the preferred embodiment, $T_{upper}$ is between the range of 0 to 20 degree and preferably 10 degrees. In the preferred embodiment, $T_{branch}$ is between the range of 15 to 25 pixels and preferably 20 pixels. In the preferred embodiment, $T_{break}$ is between the range of 10 to 20 pixels and preferably 15 pixels.

Step 435 uses the final output of step 430 to identify the minutiae. Without loss of generality, we assume that if a pixel is on a thinned ridge (8-connected), then it has a value 1, and 0 otherwise. Let (x,y) denote a pixel on a thinned ridge, and $N_0, N_1, \ldots, N_7$ denote its 8 neighbors. A pixel (x,y) is a ridge ending if $$\sum_{i=0}^{7} N_i = 1$$

and a ridge bifurcation if $$\sum_{i=0}^{7} N_i = 2$$

For each detected minutiae, the following parameters are recorded: (i) x-coordinate, (ii) y-coordinate, (iii) orientation which is defined as the local ridge orientation of the associated ridge, and (iv) the associated ridge segment. The recorded ridges are represented as one-dimensional discrete signals which are normalized by a preset length parameter which is approximately equal to the average inter-ridge distance of finger (presently computed manually once for the given imaging setup). About 10 locations on the ridge associated with each ridge are sampled per minutiae. The entire representation for a finger when stored in a compressed format takes, on an average, about

We claim:

1. A method for segmenting a foreground and background region in a digital image in a computer system, said image including a plurality of image pixels, comprising the steps of:

dividing the image into a plurality of blocks;

estimating an intensity gradient direction at each pixel in a selected one of said plurality of blocks, and further determining an overall intensity gradient direction for said selected block based on said pixel intensity gradient direction;

determining an overall intensity gradient magnitude for said selected block;

determining a vector component of the overall intensity gradient magnitude for said selected block in said overall intensity gradient direction for said selected block; and comparing said overall intensity gradient magnitude for said selected block to said vector component for said selected block to identify the selected block as in the foreground of the digital image, when said vector component is substantially equal to the overall intensity gradient magnitude.

2. A system for segmenting a foreground and background region in a digital image in a computer system, said image comprising a compilation of pixels, comprising:

means for dividing the image into a plurality of blocks;

means for estimating an intensity gradient direction at each pixel in a selected one of said plurality of blocks, and further determining an overall intensity gradient direction for said selected block based on said pixel intensity gradient;

means for determining an overall intensity gradient magnitude for said selected block;

means for determining a vector component of the overall intensity gradient magnitude for said selected block in said overall intensity gradient direction for said selected block; and means for comparing said overall intensity gradient magnitude for said selected block to said vector component to identify the selected block as in the foreground of the digital image, when said vector component is substantially equal to the overall intensity gradient magnitude.

3. A system for determining segmenting a foreground and background region in a digital image in computer system, comprising:

a computer with a memory, a central processing unit, and a database of one or more images, the images having a plurality of pixels, the image partitioned into one or more blocks of one or more of the pixels, each of the blocks having a size;

a block direction process, executed by the central processing unit, that determines a line orientation of one or more lines within one or more of the blocks, the block direction process determining a block orientation of the block based on the line orientations within the block, the block direction process further determining an overall gradient direction;

a segmentation process, executed by the central processing unit, that determines an overall gradient magnitude that is a measure of the amount of intensity variation in the current block and an overall projected gradient magnitude being a vector component of the overall gradient magnitude on the overall gradient direction, the segmentation process using a relationship between the overall gradient magnitude and the overall projected gradient magnitude in a respective block to determine whether or not the respective block is in the foreground of the digital image; and wherein the relationship is a certainty level based on the ratio of a monotonic function of the overall projected gradient magnitude to a monotonic function of the overall gradient magnitude.

4. A computer system for segmenting a foreground region in a digital image, comprising:

a memory, for storing a database of one or more images, the images having a plurality of pixels, each of said images partitioned into one or more blocks consisting of one or more of said pixels;

a block direction processing unit for estimating an intensity gradient direction at each pixel in a selected one of said plurality of blocks, said block direction processing unit further determining an overall intensity gradient direction for said selected block based on said pixel intensity gradient; and a segmentation processing unit, for measuring the amount of intensity variation in said block to obtain an overall gradient magnitude for said selected block and a vector component of the overall gradient magnitude for said selected block in said overall gradient direction for said selected block, the segmentation processing unit further comparing said overall intensity gradient magnitude for said selected block to said vector component for said selected block to identify the selected block as in the foreground of the digital image, when said vector component is substantially equal to the overall intensity gradient magnitude.

* * * * *